(12) United States Patent
Li et al.

(10) Patent No.: US 11,116,012 B2
(45) Date of Patent: Sep. 7, 2021

(54) DATA TRANSMITTING METHOD AND APPARATUS

(71) Applicant: Samsung Electronics Co., Ltd., Gyeonggi-do (KR)

(72) Inventors: Yingyang Li, Beijing (CN); Yi Wang, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 372 days.

(21) Appl. No.: 16/301,230

(22) PCT Filed: May 10, 2017

(86) PCT No.: PCT/KR2017/004788
§ 371 (c)(1),
(2) Date: Nov. 13, 2018

(87) PCT Pub. No.: WO2017/196053
PCT Pub. Date: Nov. 16, 2017

(65) Prior Publication Data
US 2020/0275490 A1 Aug. 27, 2020

(30) Foreign Application Priority Data

May 13, 2016 (CN) .......................... 201610320291.1
May 16, 2016 (CN) .......................... 201610323394.3
(Continued)

(51) Int. Cl.
*H04W 74/08* (2009.01)
*H04L 1/18* (2006.01)
(Continued)

(52) U.S. Cl.
CPC ....... *H04W 74/0833* (2013.01); *H04L 1/1812* (2013.01); *H04L 5/0007* (2013.01); *H04W 72/1242* (2013.01); *H04B 7/0413* (2013.01)

(58) Field of Classification Search
CPC .......... H04W 74/0833; H04W 72/1242; H04L 1/1812; H04L 5/0007; H04B 7/0413
See application file for complete search history.

(56) References Cited

U.S. PATENT DOCUMENTS 6,990,082 B1 * 1/2006 Zehavi .................... H04L 29/06
370/280
8,204,011 B2 * 6/2012 Kim ...................... H04L 1/1812
370/329
(Continued)

FOREIGN PATENT DOCUMENTS

WO  WO 2015151729  10/2015

OTHER PUBLICATIONS

3GPP TSG RAN WG1 Meeting #84bis, R1-162129, Busan, Korea, Apr. 11-15, 2016 (Year: 2016).*
(Continued)

*Primary Examiner* — Brian D Nguyen
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method performed by a terminal comprising, transmitting, to a base station, an uplink signal, identifying hybrid automatic repeat request (HARQ) related information corresponding to the uplink signal, and adjusting a contention window (CW) for performing an LBT mechanism based on the identified
(Continued)

HARQ related information. According to the method provided by the present disclosure, the flexibility that the base station controls the LBT mechanism of the uplink transmission of the UE can be improved, the waste of uplink resources and downlink resources can be avoided, and coexistence with another device can be ensured.

10 Claims, 12 Drawing Sheets

(30) Foreign Application Priority Data

| May 25, 2016 | (CN) | ......................... 201610353823.1 |
| Jun. 3, 2016 | (CN) | ......................... 201610391267.7 |

(51) Int. Cl.
*H04L 5/00* (2006.01)
*H04W 72/12* (2009.01)
*H04B 7/0413* (2017.01)

(56) References Cited

U.S. PATENT DOCUMENTS

| 8,867,430 | B2* | 10/2014 | Chung | .................. H04L 5/0057 370/315 |
| 2015/0023315 | A1* | 1/2015 | Yerramalli | .......... H04W 72/042 370/330 |
| 2015/0110012 | A1 | 4/2015 | Bhushan et al. | |
| 2015/0201429 | A1 | 7/2015 | Chen et al. | |
| 2016/0007368 | A1 | 1/2016 | Moon et al. | |
| 2016/0127098 | A1* | 5/2016 | Ng | ....................... H04L 5/0048 370/329 |
| 2016/0337867 | A1 | 11/2016 | Uchino et al. | |

OTHER PUBLICATIONS

Channel sensing based dynamic adjustment of contention window in LAA-LTE networks 2016 8th International Conference on Communication Systems and Networks (COMSNETS) Jan. 5-10, 2016, (Year: 2016).*
3GPP TSG RAN WG1 Meeting #84 R1-160392 St Julian's, Malta, Feb. 15-19, 2016 (Year: 2016).*
3GPP TSG RAN WG1 Meeting #84 R1-160674 St Julian's, Malta, Feb. 15-19, 2016 (Year: 2016).*
3GPP TSG RAN WG1 Meeting #84 R1-160676 St Julian's, Malta, Feb. 15-19, 2016 (Year: 2016).*
PCT/ISA/210 Search Report issued on PCT/KR2017/004788 (pp. 3).
PCT/ISA/237 Written Opinion issued on PCT/KR2017/004788 (pp. 8).
LG Electronics, Evaluation of LBT operation in LAA UL, R1-162472, 3GPP TSG RAN WG1 Meeting #84bis, Apr. 2, 2016, pp. 14.
Huawei, HiSilicon, "Contention Window Size Adjustment for UL Category 4 LBT for eLAA", R1-162129, 3GPP TSG RAN WG1 Meeting #84bis, Apr. 11-15, 2016, 4 pages.
Huawei, HiSilicon, "Other Issues Related to LBT for eLAA", R1-160741, 3GPP TSG RAN WG1 84 Meeting, Feb. 15-19, 2016, 5 pages.
Lenovo, "Contention Window Size Adjustment for LBT Category 4 for LAA PDSCH Transmission", R1-156733, 3GPP TSG RAN WG1 Meeting #83, Nov. 15-22, 2015, 6 pages.
LG Electronics, "DL LBT Design in LAA", R1-156856, 3GPP TSG RAN WG1 meeting #83, Nov. 15-22, 2015, 6 pages.
European Search Report dated Oct. 15, 2019 issued in counterpart application No. 17796353.5-1215, 10 pages.

* cited by examiner

[Fig. 1]
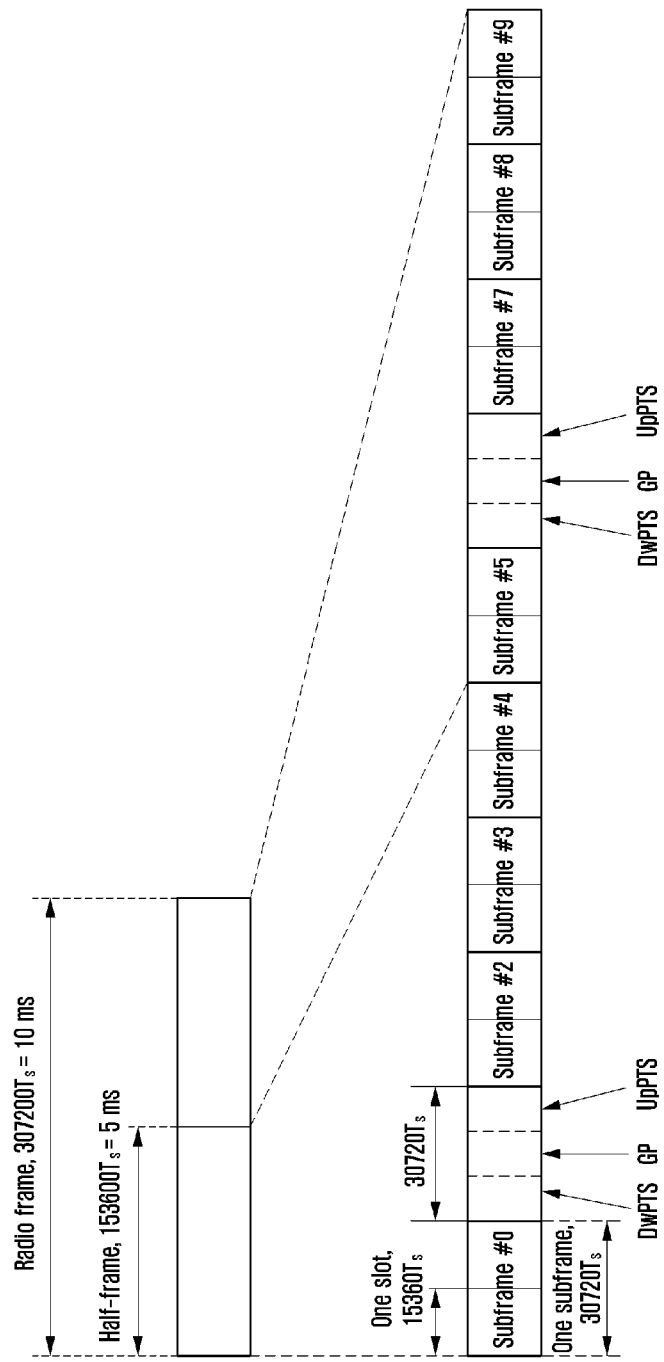

[Fig. 2]
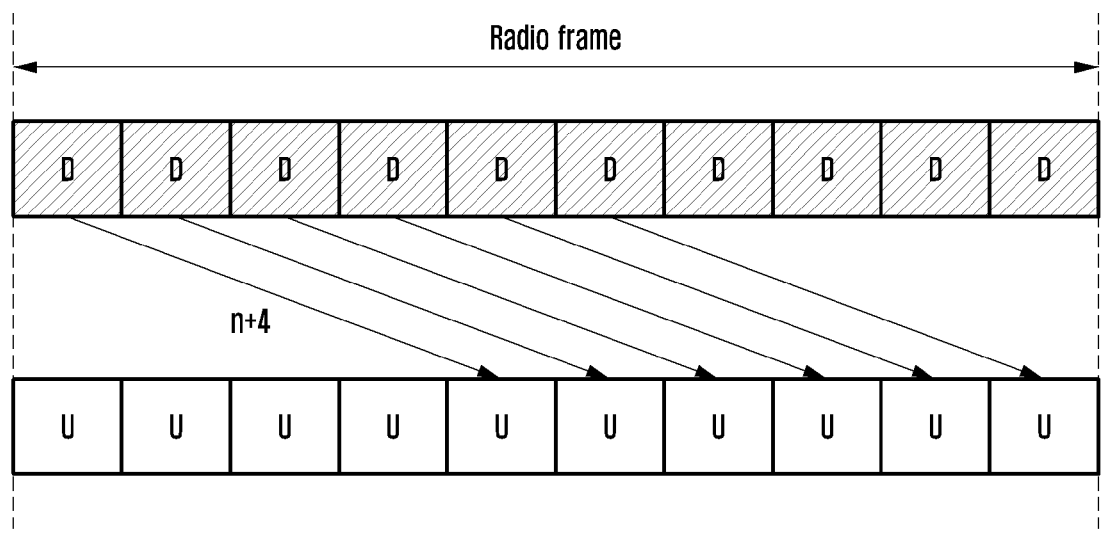
[Fig. 3]
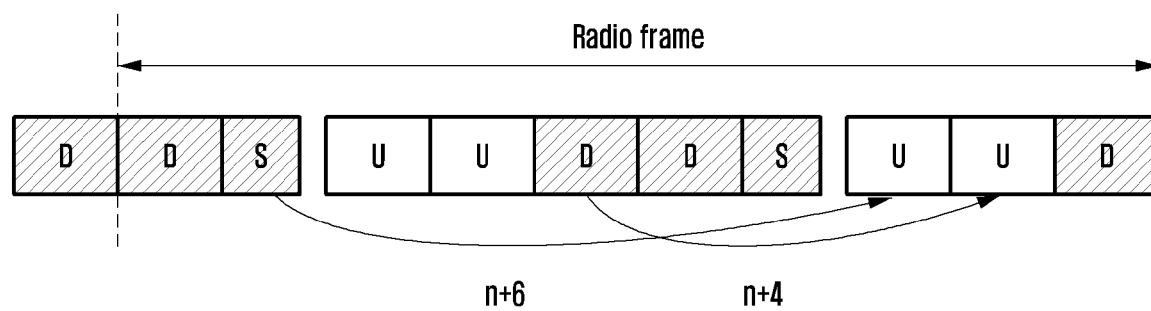

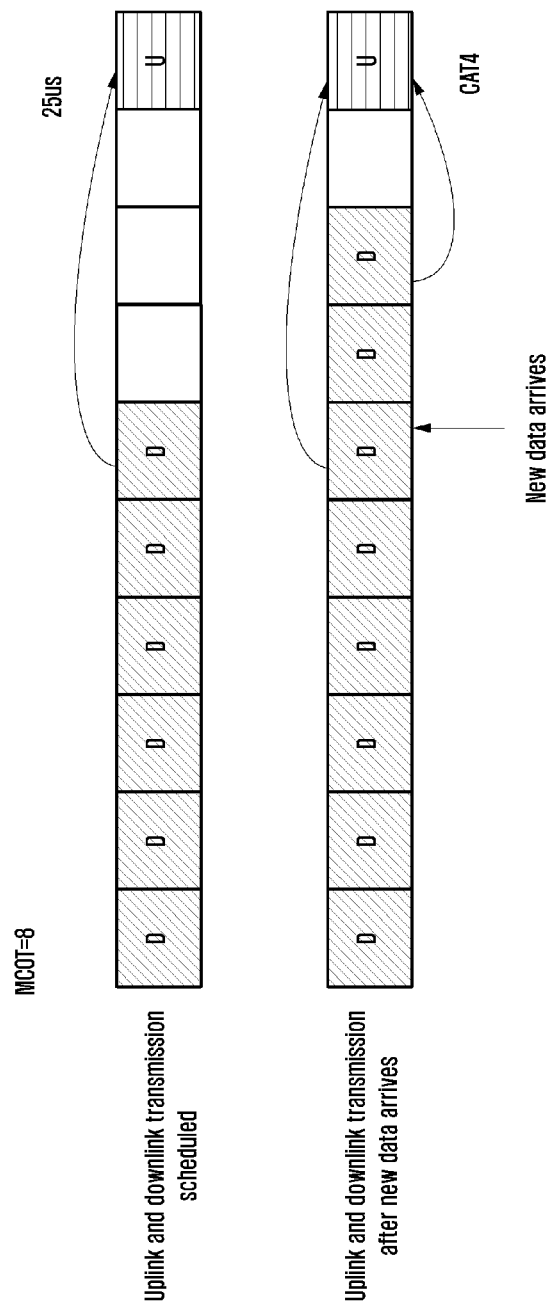
[Fig. 4]

[Fig. 5]
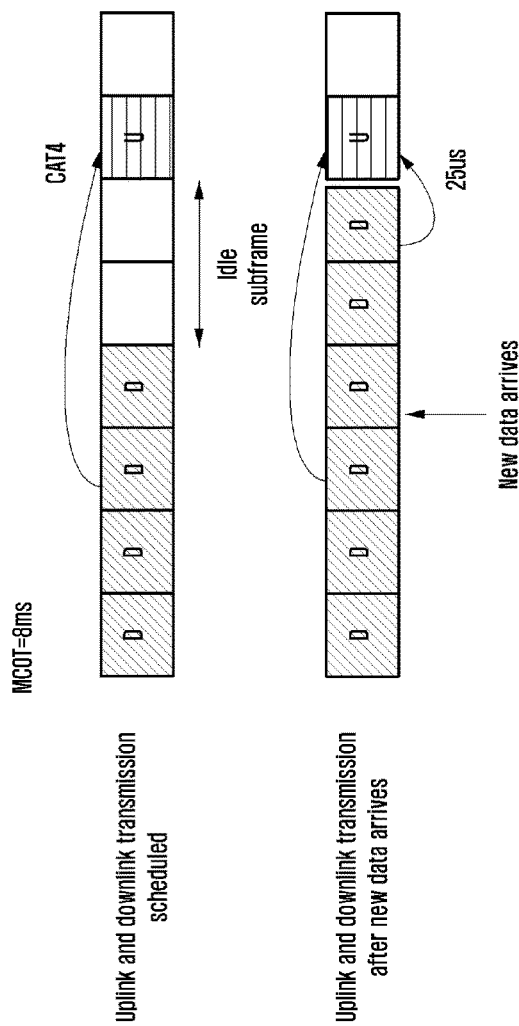
[Fig. 6]
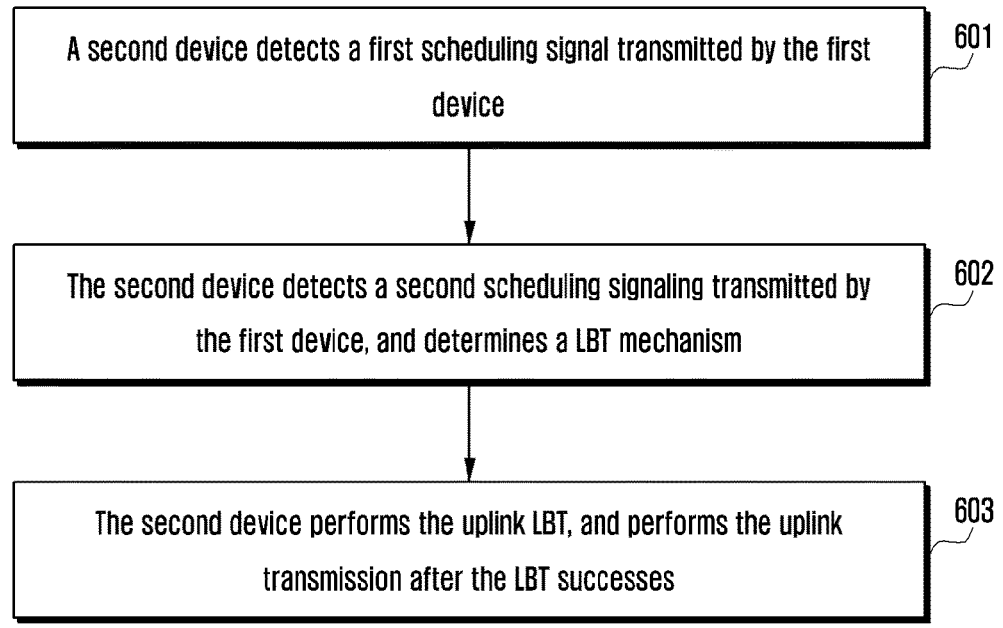

[Fig. 7]
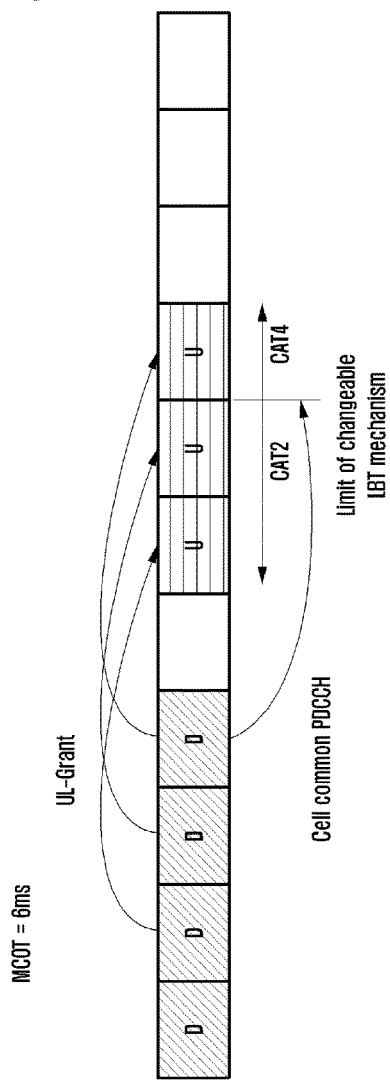
[Fig. 8]
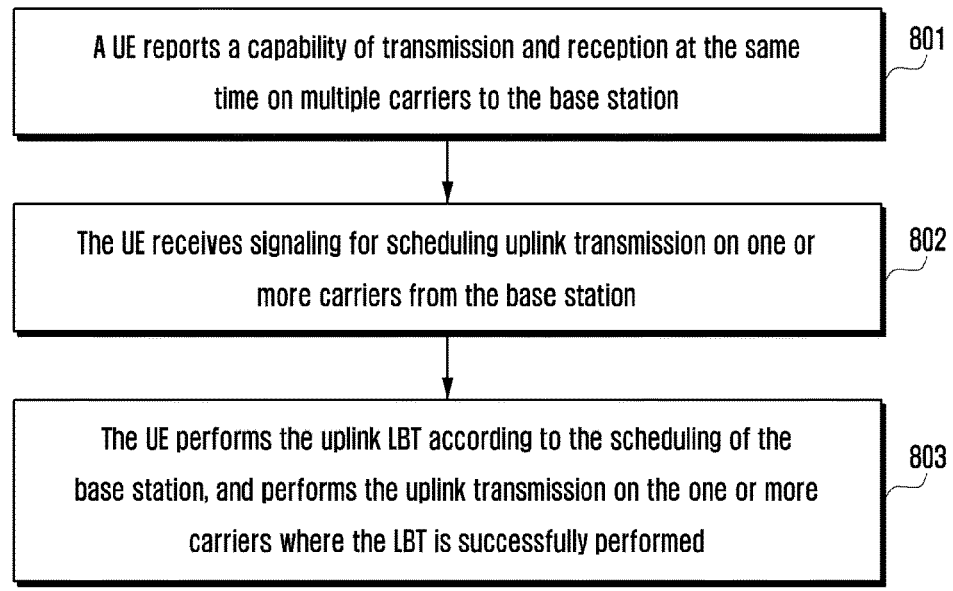

[Fig. 9]
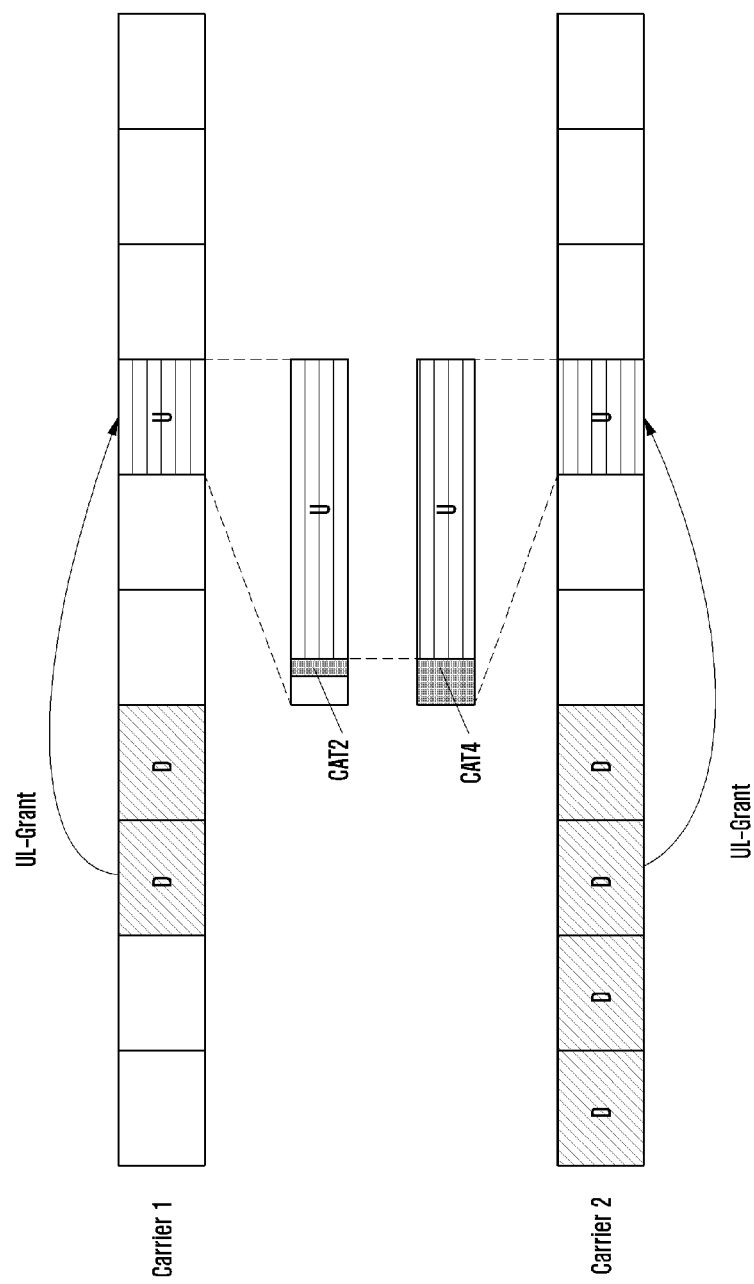

[Fig. 10]
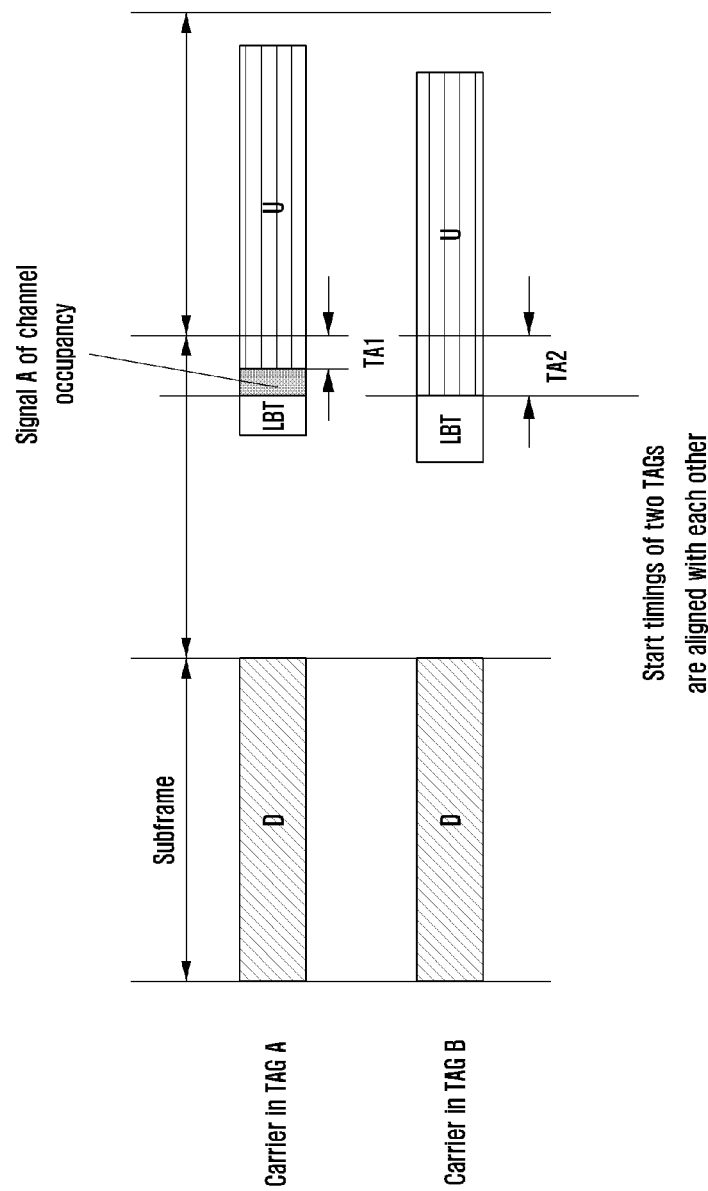

[Fig. 11]
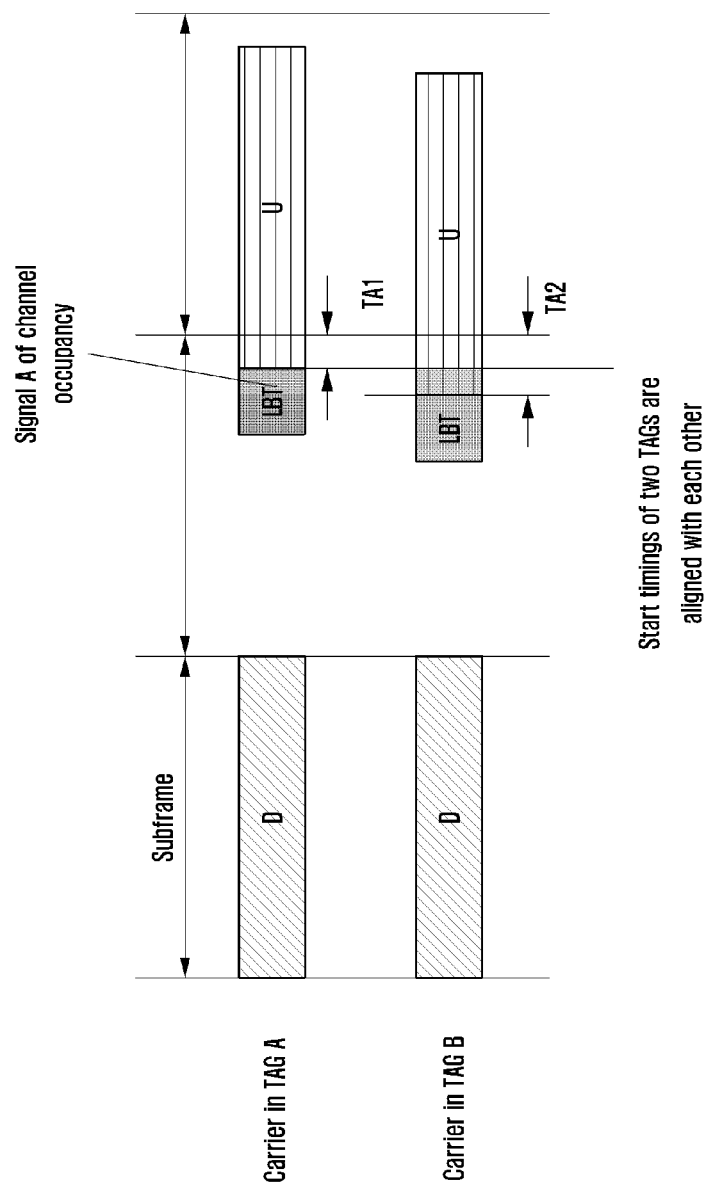

[Fig. 12]
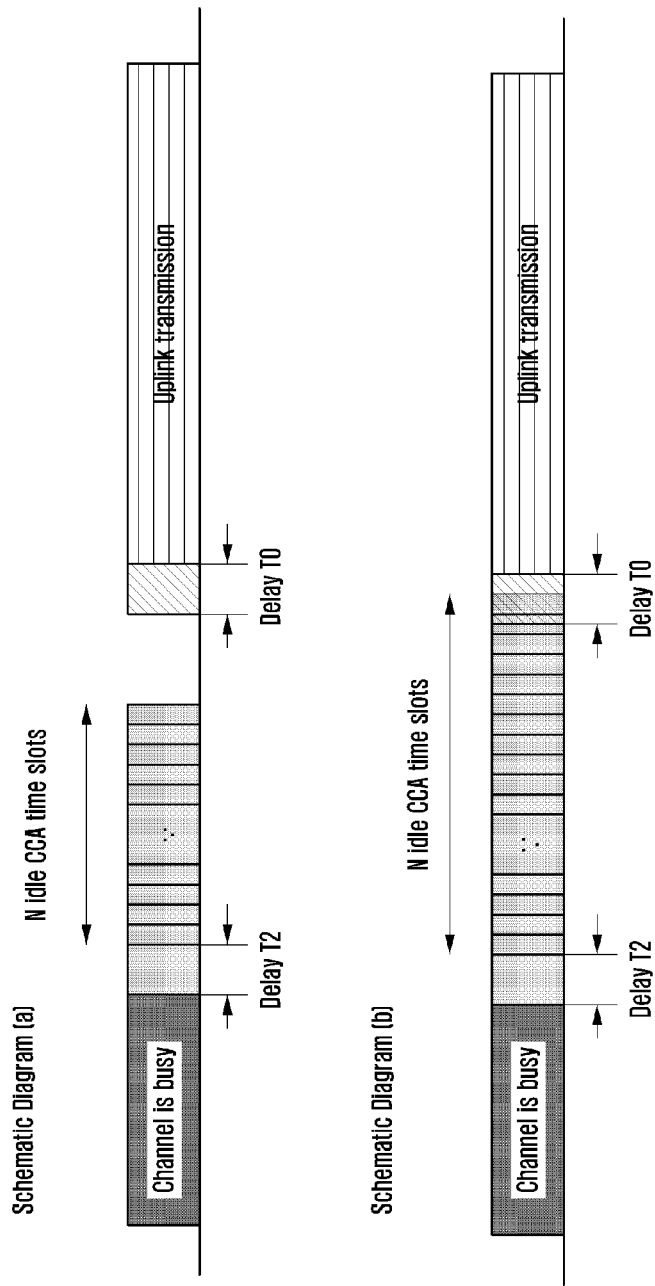

[Fig. 13]
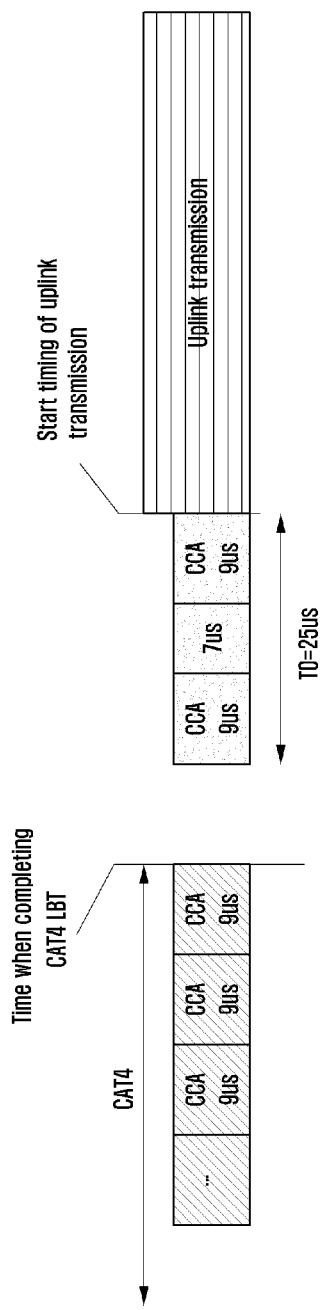

[Fig. 14]
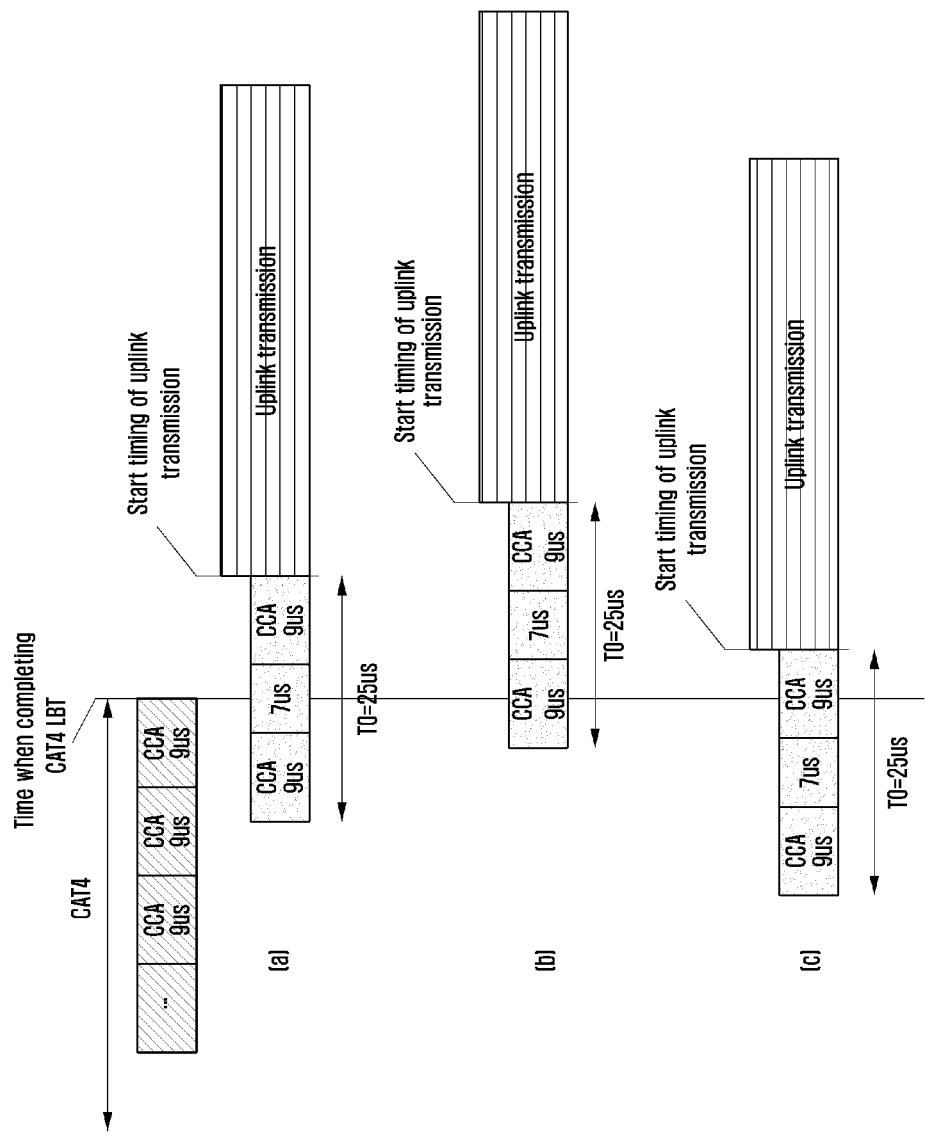

[Fig. 15]
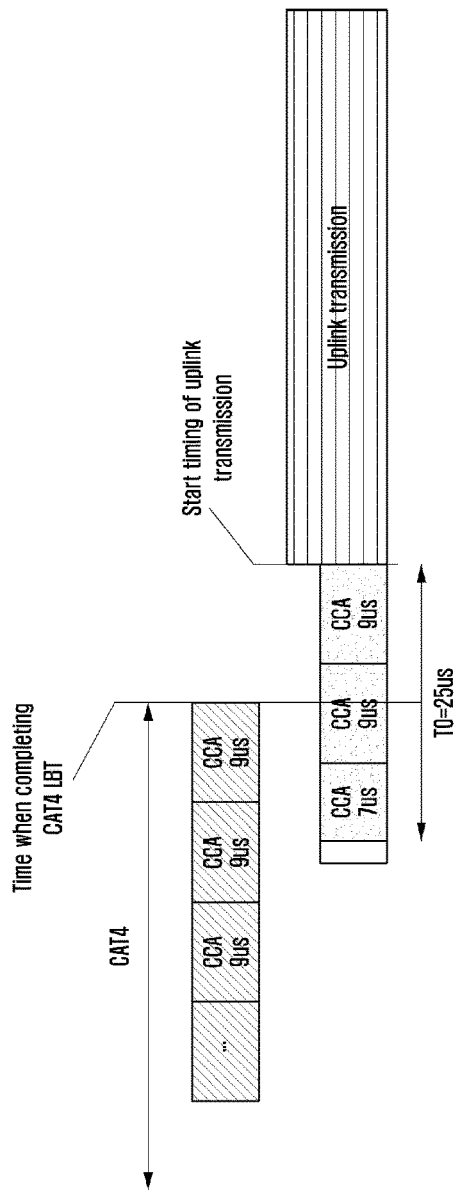
[Fig. 16]
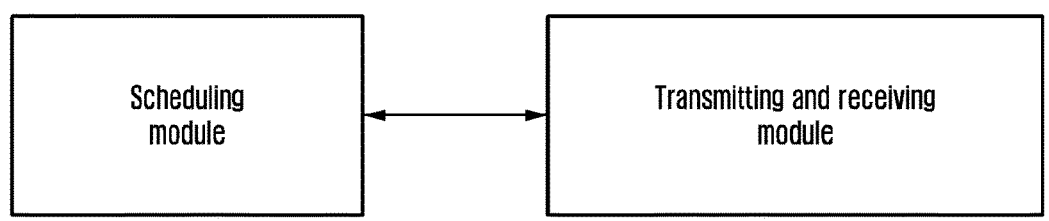
[Fig. 17]
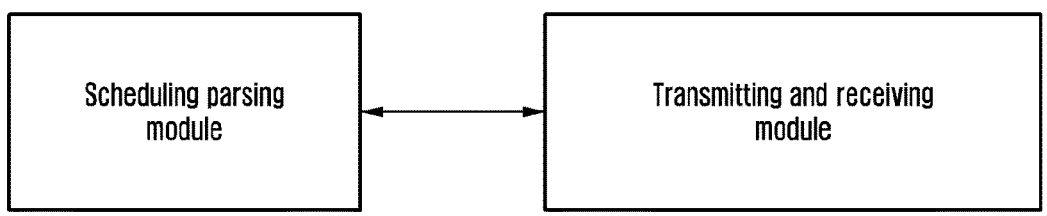

DATA TRANSMITTING METHOD AND APPARATUS

PRIORITY

This application is a National Phase Entry of PCT International Application No. PCT/KR2017/004788 which was filed on May 10, 2017, and claims priority to Chinese Patent Application Nos. 201610320291.1, 201610323394.3, 201610353823.1, and 201610391267.7, which were filed on May 13, 2016, May 16, 2016, May 25, 2016, and Jun. 3, 2016, respectively, the content of each of which is incorporated herein by reference.

Technical Field

The present invention relates to wireless communication system technologies, and more particularly, to a data transmitting method and apparatus in an unlicensed frequency band.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, the 3rd Generation Partnership Project (3GPP) Long Term Evolution (LTE) system supports three types of frame structures. The frame structures include FDD and TDD, which are usually deployed in a licensed frequency band. A third frame structure is used in an unlicensed frequency band, and is based on coexistence between Listen Before Talk (LBT) and another radio access technology. A radio frame with a length of 10 ms is configured for the three frame structures above, and is equally divided into 10 subframes with a length of 1 ms. Each subframe is composed of two consecutive time slots with a length of 0.5 ms, i.e., the k'th subframe includes time slot 2 k and time slot 2 k+1, k=0,1, . . . 9. FIG. 1 is a schematic diagram illustrating a frame structure of a TDD system. Each subframe is equally divided into two half-frame with a length of 5 ms. Each half-frame includes 8 slots each of which has a length of 0.5 ms and 3 special fields, i.e. Downlink Pilot Time Slot (DwPTS), Guarding Period (GP) and Uplink Pilot Time Slot (UpPTS). The 3 special fields have a total length of 1 ms. The third frame structure also supports a partial-subframe structure, i.e., a start part of the subframe is used for downlink transmission, i.e., DwPTS. A downlink transmission time interval (TTI) is defined in a subframe.

In a LTE system, a wider work bandwidth can be obtained by using a carrier aggregation (CA) technology. A cell is a Primary cell (Pcell), and another cell is called as a Secondary cell (Scell). The third frame structure deployed in the unlicensed frequency band may be configured for the Scell, i.e., another cell in the licensed frequency band is configured as a Pcell.

In the LTE system, the first n OFDM (Orthogonal Frequency Division Multiplexing) symbols in each downlink subframe may be used for transmitting downlink control information (DCI). The DCI include Physical Downlink Control Channel (PDCCH) and other control information, wherein n is equal to 0, 1, 2, 3 or 4. The other OFDM symbols may be used for transmitting Physical Downlink Shared Channel (PDCCH) or enhanced PDCCH (EPDCCH). In the LTE system, PDCCH and EPDCCH respectively bear DCI for allocating uplink channel resources or downlink channel resources which are respectively called as downlink assignment signaling (referred to as DL-Assignment) and uplink grant signaling (referred to as UL-Grant). In the LTE system, DCI of different UEs is transmitted individually, and the DL-Assignment and the UL-Grant in the DCI are also transmitted individually.

In the LTE system, for the uplink data transmission, the UL-Grant transmitted in downlink subframe n is used for scheduling data transmission in uplink subframe n+k. As shown in FIG. 2, in FDD system, k is equal to 4. As shown in FIG. 3, in TDD system, because of the limitation of the frame structure, k is more than or equal to 4. For the third frame structure, according to discussion in the current standard conference, a timing relation of the UL-Grant and the uplink data scheduled by the UL-Grant may be dynamic, but it is still be satisfied that a delay is more than or equal to 4.

According to discussion in the current standard conference, there are multiple LBT solutions used for the uplink transmission. A first solution is LBT Category 4 (referred to as CAT4), i.e., the device generates a random number N according to a size of a contention window (CW), only when the number of times of detecting that the channel is idle reaches N, the channel may be occupied. The device may immediately transmit a filling signal for channel occupancy until a start timing of the scheduled uplink transmission, and then starts the scheduled uplink transmission; or, the device may perform a Self-Defer process, but when the device detects that the channel is idle in a time period with a length of T0 again before the start timing of the scheduled uplink transmission, e.g., T0 is equal to 25 us, the device starts the scheduled uplink transmission. Another solution is LBT Category 2 (referred to as CAT2), i.e., only when the device detects that the channel is idle in a time period with a length of T1 before the start timing of the scheduled uplink transmission, e.g., T1 is equal to 25 us, the device may occupy the channel. Alternatively, another solution is NO LBT, i.e., after the device performs a delay of a time period with a length of T3 after completing the downlink transmission, e.g., T3 is equal to 16 us, i.e., consistent with a Short interframe space (SIFS) of WiFi, the device may not perform the LBT, and directly starts the uplink transmission. The LBT solutions above are still in discussion, a progress includes that if the base station preempts the channel through the LBT operation and a time period actually for the downlink transmission is less than a maximum channel occupancy time, the uplink transmission is scheduled in the rest of the MCOT, and the UE may perform the CAT2 LBT; otherwise, the UE needs to perform CAT4 LBT. Based on the LBT candidate methods above, how to schedule and perform the uplink transmission on the carrier in the unlicensed frequency band is a problem to be solved.

In addition, for the third frame structure, when the base station works on multiple carriers and frequencies of the carriers are neighbor to each other or the interval between the frequencies is small, the transmission operation and the reception operation cannot be performed simultaneously on these carriers.

DISCLOSURE OF INVENTION

Technical Problem

That is because the filter is not ideal, and the signal transmitted on a carrier by the base station may be leaked to another carrier, which interferes with the reception operation on the another carrier. Accordingly, when the UE configures multiple carriers in the unlicensed frequency band, how to effectively perform the uplink transmission on the multiple carriers is a problem to be solved.

Solution to Problem

The present invention provides a data transmitting method, apparatus and a base station, and further provides a channel contention method based on LBT, so as to ensure friend coexistence with another system in unlicensed frequency bands.

In order to implement the intention above, the present disclosure provides technical solutions as follows.

A data transmitting method includes:
  detecting, by a second device, scheduling signaling transmitted by a first device, determining a Listen Before Talk (LBT) mechanism for channel contention configured by the first device, and a corresponding parameter; and
  performing, by the second device, LBT, and transmitting uplink data after the LBT is successfully performed.

Preferably, the second device detecting the scheduling signaling transmitted by the first device comprises:
  detecting, by the second device, a first scheduling signaling transmitted by the first device,
  detecting, by the second device, a second scheduling signaling transmitted by the first device, wherein the second scheduling signaling comprises indication information of the LBT mechanism.

Preferably, the second device detecting the second scheduling signaling transmitted by the first device comprises:
  for a group or all of second devices, detecting the second scheduling signaling according to a common indicator (Radio Network Temporary Indicator, RNTI), wherein the second scheduling signaling indicates the LBT mechanism of the uplink transmission; or
  detecting a common PDCCH indicating a downlink subframe type, wherein the common PDCCH indicates the LBT mechanism of the uplink transmission.

Preferably, the second scheduling signaling indicates the LBT mechanism of the uplink transmission through at least one of ways as follows:
  bit mapping is used to indicate the LBT mechanism used for each subframe;
  a location of a first subframe in which the data transmission of the second device is scheduled is indicated, and the bit mapping is used to successively indicate the LBT mechanism of each subframe;
  a reference subframe is indicated, the data transmission of the second device scheduled in a subframe before the reference subframe is based on a first LBT, and the data transmission of the second device scheduled in another subframe is based on a second LBT; or
  two reference subframes are indicated, in a subframe corresponding to a first reference subframe, if the data transmission of the second device is scheduled, the LBT mechanism is NO LBT; the data transmission of the second device scheduled in the subframe after the first reference subframe and before the second reference subframe is based on CAT2, and the data transmission of the second device scheduled in another subframe is based on CAT4.

Preferably, when the first scheduling signaling comprises information indicating the LBT mechanism used by the second device, after the second device detects the first scheduling signaling transmitted by the first device, the method comprises:
  if the second device receives the second scheduling signaling, performing channel contention according to the LBT mechanism indicated by the second scheduling signaling; if the second device does not receive the second scheduling signaling, performing the channel contention according to the LBT mechanism indicated by the first scheduling signaling, or performing the channel contention by using a pre-defined LBT mechanism.

Preferably, when the first scheduling signaling does not comprise information indicating the LBT mechanism used by the second device, the method further comprises:

if receiving the second scheduling signaling, performing, by the second device, the channel contention according to the LBT mechanism indicated by the second scheduling signaling; if not receiving the second scheduling signaling, performing, by the second device, the channel contention by using a pre-defined LBT mechanism.

Preferably, a base station is the first device, a UE is the second device, wherein the determining the LBT mechanism for the channel contention configured by the first device and the corresponding parameter, performing the uplink LBT and transmitting the uplink data comprises:

reporting, by the UE, a capability of simultaneous transmission and reception on neighbor carriers;

receiving, by the UE, signaling of uplink transmission scheduling on one or more carriers, wherein the signaling comprises the LBT mechanism indicated by the base station and the corresponding parameter;

performing, by the UE, the uplink LBT according to the base station scheduling, and performing the uplink transmission on the one or more carriers on which the LBT is successfully performed.

Preferably, the UE reporting the capability of simultaneous transmission and reception on the neighbor carriers comprises:

only reporting, by the UE, one capability of simultaneous transmission and reception, wherein the capability is used for various combinations of channels/signaling for transmission and reception; or respectively reporting, by the UE, capabilities of simultaneous transmission and reception for different combinations of channels/signaling.

Preferably, the capability of simultaneous transmission and reception on the neighbor carriers reported by the UE comprises at least one of items as follows:

the UE reports a band combination which is supported by the UE and for which there is no limitation for simultaneous transmission and reception, or the UE reports a band combination for which there is limitation for simultaneous transmission and reception; or the UE reports a frequency interval threshold $T_F$, and the UE does not support simultaneous transmission and reception on any two carriers the frequency interval of which is less than or equal to $T_F$; or the UE reports the frequency interval threshold $T_F$, and the UE does not support simultaneous transmission and reception on any two carriers which respectively belong to different frequency bands and the frequency interval of which is less than or equal to $T_F$.

Preferably, the LBT mechanism indicated by the base station and the corresponding parameter comprises:

for a group of carriers, the base station respectively maintains a corresponding parameter of CAT4 for each carrier;

for the group of the carriers, when the base station only configures CAT4 to be performed on one carrier, the method that the base station determines a CW parameter of CAT4 of the carrier comprises: determining the CW parameter of CAT4 of the carrier according to parameters of all carriers in the group of the carriers, such as CWs, etc.; or determining the CW parameter of CAT4 of the carrier according to parameters of all carriers actually scheduled currently in the group of the carriers, such as CWs, etc.; or for a carrier on which the uplink transmission is actually scheduled currently, if it is satisfied that the scheduled uplink transmission is outside MCOT of the carrier of the base station, determining the corresponding CAT4 parameter dynamically indicated above according to the parameter of the carrier, such as, a CW, etc.

Preferably, the LBT mechanism indicated by the base station and the corresponding parameter comprises:

for a group of carriers, when the base station only configures and performs CAT4 on one carrier, the base station configures component carriers contained in the group of the carriers for the UE;

for the group of the carriers, the base station respectively maintains the corresponding parameter of CAT4 of each carrier, and does not configures the component carriers contained in the group of the carriers for the UE.

Preferably, the UE performing the uplink LBT according to the base station scheduling comprises:

working, by the UE, respectively on each carrier according to the LBT mechanism indicated by the base station; or performing, by the UE, CAT4 on one carrier, and performing CAT2 on another scheduled carrier.

Preferably, if it is assumed that the uplink carriers configured for the UE by the base station belongs to multiples TAGs, the UE performing the LBT according to the base station scheduling comprises:

for a carrier in a TAG with a later timing, transmitting, by the UE, a signal A for channel occupancy until a start timing of uplink transmission scheduled on the carrier, and taking the start timing of the signal A aligned with a start timing of the uplink transmission scheduled on a carrier in a TAG with an earlier timing, starting, by the UE, data transmission if the LBT is completed before the start timing of the signal A; or for the carrier in the TAG with the earlier timing, dropping a former part of scheduled uplink transmission, so that the start timing of the uplink transmission is aligned with the start timing of the carrier in the TAG with the later timing, and starting, by the UE, the data transmission if the LBT is completed before the start timing of the carrier in the TAG with the later timing.

Preferably, a base station is the first device, a UE is the second device, the second device performing the uplink LBT and transmitting the uplink data after the LBT is successfully completed comprises:

when a channel is idle in a time period of T0 us before the start timing of the scheduled uplink transmission, transmitting, by the UE, the uplink data, wherein the idle time period of T0 us is divided into first 16 us and subsequent consecutive k idle CCA slots, k=1, a length of a CCA slot is 9 us, and a former part of the first time period 16 us comprises an idle CCA slot; or when T is larger than or is equal to T0 and the UE detects that each CCA slot in the time period T0 is idle, transmitting, by the UE, the uplink data; when T is less than T0 and the UE detects that the entire time in the time period T is idle, transmitting, by the UE, the uplink data, wherein T is a time interval between a timing location when CAT4 of the UE is successfully performed and the start timing of the scheduled uplink transmission of the UE; or when T is larger than or is equal to T0 and the UE detects that each CCA slot in the time period T0 is idle, transmitting, by the UE, the uplink data; when T is less than T0 and a time period when the UE does not perform CCA detection is less than X us, X is a constant, and the entire time except the time period when the UE does not perform CCA detection in the time period T is idle, transmitting, by the UE, the uplink data, wherein T is a time interval between a timing location when CAT4 of the UE is successfully performed and the start timing of the scheduled uplink transmission of the UE.

Preferably, a base station is the first device, a UE is the second device, the LBT mechanism of the channel contention configured by the first device and the corresponding parameter comprises:

the uplink reference subframe used for adjustment of the CW of the uplink CAT4 by the base station is an uplink subframe in which the UE is configured with channel contention based on CAT4; or the uplink reference subframe used for adjustment of the CW of the uplink CAT4 by the base station is an uplink subframe in which the UE is configured with channel contention based on CAT4 and/or CAT2; or the uplink reference subframe used for adjustment of the CW of the uplink CAT4 by the base station is an uplink subframe in which the UE is configured with channel contention based on NO LBT, CAT2 and/or CAT4.

Advantageous Effects of Invention

According to the method provided by the present disclosure, the flexibility that the base station controls the LBT mechanism of the uplink transmission of the UE can be improved, the waste of uplink resources and downlink resources can be avoided, and coexistence with another device can be ensured.

BRIEF DESCRIPTION OF DRAWINGS

FIG. 1 is a schematic diagram illustrating a frame structure of a TDD system;

FIG. 2 is a schematic diagram illustrating a timing relation of uplink scheduling in an existing FDD system;

FIG. 3 is a schematic diagram illustrating a timing relation of uplink scheduling in an existing TDD system;

FIG. 4 is a first schematic diagram illustrating adjustment of a LBT mechanism according to whether it is within MCOT;

FIG. 5 is a second schematic diagram illustrating adjustment of a LBT mechanism according to whether it is within MCOT;

FIG. 6 is a flowchart illustrating a method for configuring a LBT mechanism of data transmission according to an embodiment of the present application;

FIG. 7 is a schematic diagram illustrating a process of indicating a LBT mechanism of data transmission according to an embodiment of the present application;

FIG. 8 is a flowchart illustrating a method for performing LBT of carrier aggregation according to an embodiment of the present application;

FIG. 9 is a schematic diagram illustrating a process of respectively performing LBT on multiple carriers in a same TAG;

FIG. 10 is a first schematic diagram illustrating a process of respectively performing LBT on multiple carriers in different TAGs according to an embodiment of the present application;

FIG. 11 is a first schematic diagram illustrating respectively a process of performing LBT on multiple carriers in different TAGs;

FIG. 12 is a schematic diagram illustrating a channel contention based on Self-Defer CAT4;

FIG. 13 is a schematic diagram illustrating that a time period of CAT4 channel detection and a time period of T0 us is not overlapped;

FIG. 14 is a first schematic diagram illustrating that a time period of CAT4 channel detection and a time period of T0 us is overlapped;

FIG. 15 is a second schematic diagram illustrating that a time period of CAT4 channel detection and a time period of T0 us is overlapped;

FIG. 16 is a second schematic diagram illustrating an apparatus of a base station;

FIG. 17 is a second schematic diagram illustrating an apparatus of a UE;

MODE FOR THE INVENTION

The present invention will be described in further detail hereinafter with reference to accompanying drawings and embodiments to make the objective, technical solution and merits therein clearer.

Embodiment 1

On a carrier in an unlicensed frequency band, a device preempts a channel based on a LBT mechanism, and a time period in which the device occupies the channel cannot exceed a maximum channel occupancy time (MCOT), so as to remain a channel contention chance for another device. If an actual data transmission time is less than the MCOT after the first device preempts the channel through the LBT operation and the data transmission of the second device is scheduled after the data transmission of the first device, for the data transmission of the second device in a subframe, only if the current subframe is within the MCOT of the channel occupied by the first device, the second device may perform a first LBT to determine whether the data transmission may be performed in the subframe; otherwise, the second device needs to perform a second LBT to determine whether the data transmission may be performed in the subframe. The first LBT is more aggressive than the second LBT, so that it is easier to preempt the channel by using the first LBT. For example, the first LBT above may be CAT2 LBT, the second LBT above may be CAT2 LBT; or the first LBT above may be NO LBT, the second LBT above may be CAT2 LBT. Alternatively, the first LBT above may be NO LBT; the second LBT above may be CAT4 LBT. The first device may be a base station, and the second device may be one or more UEs accordingly. When the base station schedules multiple subframes for the UE, the base station may only schedule the UE to use one or two of the three LBT mechanisms, or may allow the UE to use the three LBT mechanisms.

A condition of determining that the current subframe is within MCOT of the channel occupied by the first device may include that it is not limited that the data transmission of the first device and the scheduled data transmission of the second device occupies consecutive subframes, and it is only required that a sum of a time period of data transmission of the first device and a time period of scheduled data transmission of the second device does not exceed the MCOT. Alternatively, the condition above of determining that the current subframe is within MCOT of the channel occupied by the first device may include that it is required that the data transmission of the first device and the scheduled data transmission of the second device occupies the consecutive subframes, and the sum of the time period of the data transmission of the first device and the time period of the scheduled data transmission of the second device does not exceed the MCOT. According to the two methods above, when the sum of the time period of the data transmission of the first device and the time period of the scheduled data transmission time of the second device, i.e., the total transmission time period, is calculated, a time interval is leaved to perform the LBT operation, i.e., one or more idle OFDM symbols may be calculated in the total transmission time period, or may not be calculated in the total transmission time period. Alternatively, when a length of a total time period from a time when the first device completes the LBT channel occupancy to a subframe for the scheduled data transmission of the second device is less than or equal to the MCOT, the second device performs the first LBT regardless whether the data transmission of the first device and the data transmission of the scheduled second device occupies the consecutive subframes; otherwise, the second device performs the second LBT.

The determination that the subframe is within the MCOT of the occupied channel of the first device may be actually variable. Assume that in a nth subframe, the first device schedules the data transmission of the second device in a (n+k)th subframe, e.g., in LTE system, k is less than or equal to 4. In the nth subframe, the first device determines whether the data transmission of the second device scheduled by the first device is within MCOT based on the uplink and downlink traffic information currently stored and scheduling delay k. However, since the uplink and downlink traffic information may be changed before the (n+k)th subframe, the determination whether the data transmission of the second device is still within the MCOT may be changed. Thus, after the first device schedules the data transmission of the second device in the nth subframe, a mechanism is in demand to allow the first device to determine the LBT mechanism of the data transmission of the second device in the (n+k)th subframe after the nth subframe and before the (n+k)th subframe. The LBT mechanism adjustment above may be completed by transmitting another piece of control information. On the carrier, whether the data transmission of the second device is within the MCOT is determined according to the transmission time of the first device and the total transmission time of all second devices until the current frame, i.e., it is not dependent about a specific second device, thus, the control information for the LBT mechanism adjustment may be common for a cell, that is, may be used for a group or all of the second devices.

Two examples of variable LBT for data transmission of a second device are described below, but conditions for the variable LBT mechanism are actually not limited to the two conditions below.

Assumed that a condition that the second device performs the LBT is not limited in that the data transmission of the first device and the scheduled data transmission of the second device occupy consecutive subframes, but only requires that the sum of the time period of the data transmission of the first device and the time period of the scheduled data transmission of the second device does not exceed the MCOT. As shown in FIG. 4, it is assumed the MCOT is equal to 8 ms, when the base station transmits UL-Grant to schedule the uplink transmission of the UE, for some reasons, such as in that downlink traffic account is not large, etc., the base station determines that the downlink data transmission is only within 6 subframes. Thus, since the total of the uplink transmission time period and the downlink transmission time period are only 7 ms, which is less than the MCOT, the base station indicates that the CAT2 may be used for the uplink data transmission scheduled by the base station. However, when new downlink data arrives after transmitting the UL-Grant, the base station temporarily determines to transmit downlink data within 8 ms, which causes that the uplink transmission previously scheduled is actually outside the MCOT, thus, the base station needs to transmit new control information to indicate that the LBT mechanism is changed to CAT4.

Assume that the condition that the second device performs the first LBT includes requiring that the data transmission of the first device and the scheduled data transmission of the second device occupy the consecutive subframes, and requiring that the sum of the data transmission time of the first device and the data transmission time of the scheduled second device does not exceed the MCOT. As shown in FIG. 5, it is assumed that the MCOT is equal to 8 ms, when the base station transmits the UL-Grant to schedule the uplink transmission of the UE, for reasons such as in that the downlink traffic amount is not large, the base station determines to transmit the downlink data only in 4 subframes, which causes that the uplink transmission and the downlink transmission cannot occupy all consecutive subframes, thus, the base station indicates that the uplink data transmission scheduled by the base station may use CAT4. However, when the new downlink transmission arrives after transmitting the UL-Grant, the base station temporarily determines to perform downlink data transmission in 6 ms before the subframe where the uplink data is scheduled. Thus, the uplink transmission and the downlink transmission occupy all consecutive subframes, and the total of the uplink transmission time and the downlink transmission time is only 7 ms, which is less than the MCOT, thus, the base station may transmit the new control information to indicate that the LBT mechanism is changed to CAT2.

FIG. 6 is a flowchart illustrating a method that a second device determines a LBT mechanism and transmits uplink data according to the present disclosure.

At block 601, the second device detects a first scheduling signal transmitted by the first device, wherein the first scheduling signaling is used to schedule the data transmission of the second device, and indicates information such as an allocated time-frequency resource and MCS. For example, the first scheduling signaling is equivalent to the UL-Grant in existing LTE system. The first scheduling signaling may include uplink LBT information, or may not include the uplink LBT information.

At block 602, the second device detects a second scheduling signaling transmitted by the first device, wherein the second scheduling signaling at least includes indication information related with the LBT mechanism. The scheduling signaling may be respectively transmitted to each second device. Alternatively, the second scheduling signaling may be used for a group or all of second devices. For example, the second scheduling signaling may re-use an existing DCI format, e.g., the number of bits of DCI 1A or DCI 1C, so as to reduce the number of times of blind detection. A common indicator (RNTI) is allocated for the group or all of the second devices to indicate the second scheduling signaling; or a cell common PCDDH defined for a downlink LAA system in LTE Rel-13 may be extended to indicate the LBT mechanism needed to be used for the simultaneous data transmission in the uplink subframe when indicating a downlink subframe type.

A LBT category indicated by the second scheduling signaling may be used for all types of uplink signaling. Alternatively, the LBT mechanisms and the corresponding parameters of different types of the uplink signaling may be different, or the different types of the uplink signaling may be respectively processed. For example, when the CAT4 is used in a PUSCH, a size of a contention window (CW) of the CAT4 may be adjustable; when the CAT4 is used for SRS, the CW of the CAT4 is fixed. Thus, for the different types of the uplink signaling, different pieces of the second scheduling signaling are respectively transmitted to indicate the LBT categories. For a method that the first device is responsible for maintaining the corresponding parameter of the CAT4, for the subframe in which the CAT4 is used, the corresponding parameter of the CAT4 may be further indicated; alternatively, in a same second scheduling signaling, different fields are used to respectively indicate the LBT categories of the different types of the uplink signaling. For a method that the first device is responsible for maintaining the corresponding parameter of the CAT4, for the subframe in which the CAT4 is used, the corresponding parameter of the CAT4 may be further indicated. Alternatively, for the method for determining the LBT mechanism according to whether the uplink transmission is within the MCOT, since the LBT mechanism applying to the uplink subframe is fixed, a unique difference is in that the CAT4 parameter may be different when the CAT4 is used. Thus, if a same indication of the LBT category is shared among multiple types of uplink signaling, the LBT categories do not need to be repeatedly indicated. However, for the method that the first device is responsible for maintaining the corresponding parameter of the CAT4, for the subframe in which the CAT4 is used, the corresponding parameters of the CAT4 need to be respectively indicated for multiple types of the uplink signaling.

In the second scheduling signaling above, when the CAT4 parameter needs to be indicated, the CAT4 parameter may be respectively indicated for each uplink subframe, which includes a size of the CW and/or backoff time etc.; or only one set of CAT4 parameters may be indicated, and may repeatedly apply to each uplink subframe. When only one set of the CAT4 parameters is indicated, the indicated set of parameters may be obtained according to a maximum value of the CAT4 parameters of various scheduled uplink subframes, i.e., the indicated CW is a maximum value of CWs of the various scheduled uplink subframes, or the indicated backoff time is a maximum value of backoff times of the various scheduled uplink subframes.

A LBT mechanism indicating method for second scheduling signaling is described below.

A first LBT mechanism indicating method includes that a bitmap method is used to indicate a LBT mechanism used for each subframe scheduled for the data transmission of the second device. For example, starting from a kth subframe after the subframe where the second scheduling signaling is located, a bitmap successively indicates the uplink LBT mechanism of each subframe. k is a integer configured through a higher layer signaling, or is a pre-defined constant, k may be equal to 0, 1 or another value. For example, a condition that k is equal to 0 indicates that an ending location of the downlink transmission is a downlink partial subframe, i.e., the uplink transmission is within a latter part of the same subframe, which is equivalent to UpPTS in existing LTE system. It is not limited in the present disclosure whether this part of the uplink resource is used in PUSCH, PUCCH, PRACH or SRS. Alternatively, it is assumed that the subframe where the second scheduling signaling is located and the subframe for the scheduled data transmission are not consecutive, and an information field in the second scheduling signaling is used to indicate a start point of a first subframe for the scheduled data transmission of the second device, e.g., indicating an offset of this subframe relative to the subframe where the second scheduling signaling is located, and a bitmap successively indicates the uplink LBT mechanisms starting from a first subframe for the scheduled data transmission of the second device. According to the two methods above, for the data transmission of the second device, if only one of two LBT mechanisms can be used, 1 bit may be used to differentiate the LBT mechanisms; or if only one of three LBT mechanisms can be used, 2 bits may be used to differentiate the LBT mechanisms.

A second LBT indicating method includes indicating a reference subframe, e.g., indicating the offset relative to the subframe where the second scheduling signaling is located, i.e., if the data transmission of the second device is scheduled in a subframe before the indicated reference subframe, the first LBT is used; if the data transmission of the second device is scheduled in a subframe after the indicated reference subframe, the second LBT is used. It may be pre-defined that the first LBT or the second LBT is used for the scheduled data transmission of the second device in the subframe corresponding to the reference subframe. From the entire cell, the subframes where the data transmission of the second device is scheduled may be consecutive, or may be non-consecutive; in addition, a first subframe where the data transmission of the second device is scheduled and the subframe where the second scheduling signaling is located may be consecutive, or may be non-consecutive. In the subframe corresponding to the reference subframe, the data transmission of the second device may be scheduled, or may not be scheduled.

A third LBT mechanism indicating method indicates two reference subframes, e.g., respectively indicating an offset relative to the subframe where the second scheduling signaling is located, i.e., if the data transmission of the second device is scheduled in a subframe corresponding to a first reference subframe, the LBT mechanism is NO LBT; and the scheduled data transmission of the second device in the subframe before a second reference subframe is based on the CAT2, and the scheduled data transmission of the second device in another subframe is based on the CAT4.

In a condition that NO LBT needs to be differentiated, 1-bit information in the second scheduling signaling is used to indicate whether NO LBT is used for a first uplink transmission after the downlink transmission of the base station finishes. If a last subframe for the uplink transmission of the base station is a partial subframe and SRS transmission is triggered, it needs to be indicated whether NO LBT may be used for the uplink transmission in the subframe; if the last subframe for the downlink transmission of the base station is the partial subframe and the SRS transmission is not triggered, it needs to be indicated whether NO LBT is used for the uplink transmission in a next subframe of the last subframe for the downlink transmission of the base station. The indication for NO LBT may indicate whether NO LBT is used for the uplink transmission scheduled by the base station in the first uplink subframe.

If the last subframe for the downlink transmission of the base station is an entire subframe, it needs to be indicated whether NO LBT is used for the uplink transmission in a next subframe of the last subframe for the downlink transmission of the base station. The indication for NO LBT may indicate whether NO LBT is used for the uplink transmission scheduled in the first uplink subframe by the base station. The first uplink subframe above may be a subframe for PUSCH transmission, or may be a subframe only for SRS transmission. For example, the SRS transmission may be triggered in a latter part of the downlink partial subframe, which is equivalent to UpPTS in existing LTE; or the SRS above may be transmitted in an entire uplink subframe. The indication for NO LBT may indicate whether NO LBT is used if the uplink transmission is scheduled in the next subframe of the subframe where the second scheduling signaling is located. Alternatively, the indication for NO LBT may indicate whether NO LBT is used in the subframe where the second scheduling signaling is located if the SRS transmission is triggered, i.e., a condition that the subframe where the second scheduling signaling is located is the downlink partial subframe. Alternatively, the indication of NO LBT may indicate whether NO LBT is used if the uplink transmission is scheduled in the subframe where the second scheduling signaling is located and the next subframe of the subframe. In order to effectively support NO LBT, the second scheduling signaling may be transmitted in the last subframe for the downlink transmission of the base station, or is transmitted in the last subframe and a second last subframe for the downlink transmission of the base station to indicate whether the NO LBT may be used after the downlink transmission ends.

According to the method for processing the second scheduling signaling above, for one second device, it is assumed that the first device schedules the transmission of the second device in multiple subframes, and the second device performs the first LBT in each subframe where the second device is scheduled within the MCOT for the channel occupancy of the first device; and the second device performs the second LBT in each subframe where the second device is scheduled outside the MCOT for the channel occupancy of the first device.

Alternatively, according to the method for processing the second scheduling signaling above, for one second device, it is assumed that the first device schedules the transmission of the second device in multiple subframes, and the second device performs the first LBT in each subframe where the second device is scheduled within the MCOT for the channel occupancy of the first device; for a subframe where the second device is scheduled outside the MCOT for the channel occupancy of the first device, when the second device successfully performs the second LBT in a subframe, the first LBT is allowed to be used for the data transmission of the second device within the MCOT of the channel occupancy of the second device. In particular, for the subframe where the second device is scheduled outside the MCOT of the channel occupancy of the first device, according to a time order, the second device performs the second LBT in a former subframe according to a time order, when the second LBT fails, the second device still performs the CAT4 in a next subframe; when the second LBT successes in a subframe, if the LBT needs to be performed in the subsequent subframe where the first device schedules the transmission of the second device within the MCOT of the channel occupancy of the second device, the second device only needs to perform the first LBT. The second device performs the first LBT in all subframes where the transmission of the second device is subsequently scheduled by the first device within the MCOT of the channel occupancy of the second device and the LBT needs to be performed; or if the first LBT fails in any of the subframes, the second device needs to re-perform the CAT4 in a next subframe where the LBT needed to be performed.

As shown in FIG. 7, it is assumed that MCOT is 6 ms, thus, after the UL uplink transmission is scheduled based on the first scheduling signaling, i.e., the UL-Grant, the base station may use the second scheduling signaling, e.g., a cell common PDCCH, to indicate the LBT mechanisms needed to be used in different subframes. Since the downlink data is transmitted in 4 subframes, the cell common signaling indicates that first two subframes may use the CAT2, and latter subframes only uses the CAT4. For example, the subframe with the cell common PDCCH is denoted as subframe n, the indication information may indicate offset 3, so as to represent that a subframe with a subframe number less than or equal to (n+3) may use the CAT2, and a subframe with a subframe number more than (n+3) may only use the CAT4.

At block 603, the second device performs the uplink LBT according to the LBT mechanism determined at blocks 601 and 602, and performs the uplink transmission after the LBT successes.

The method in the present disclosure is described based on two conditions divided according to whether the uplink LBT mechanism is indicated at block 601.

A first method for determining the LBT mechanism for the data transmission of the second device includes that, at block 601, the first scheduling signaling transmitted by the first device may indicate the LBT mechanism needed to be used for the second device; next, at block 602, the first device may adjust the LBT mechanism for the data transmission of the second device by transmitting the second scheduling signaling. If the second scheduling signaling indicates that the LBT mechanism is changed from the first LBT to the second LBT, the second scheduling signaling needs to further indicate the parameter of the second LBT, and may include the size of the CW of the CAT4 and/or a random number N generated by the first device based on the CW. The random number N is the number of idle CCA slots needed to be detected when performing the CAT4.

After receiving the first scheduling signaling, the second device still needs to detect the second scheduling signaling. When the second scheduling signaling is received, the second device performs the channel contention according to LBT information indicated by the second scheduling signaling. When the second scheduling signaling is not received, the second device may perform the channel contention according to the LBT mechanism indicated by the first scheduling signaling. This method applies to a condition that the first device determines that the LBT mechanism does not need to be changed, and the second scheduling signaling is not transmitted, however, if the first device actually transmits the second scheduling signaling for changing the LBT mechanism but the second device does not correctly receive the signaling, it causes that the second device uses a different LBT mechanism. Alternatively, when the second scheduling signaling is not received, the second device may fixedly use a certain LBT mechanism for the channel contention. For example, for friend coexistence, the second device may use relatively conservative second LBT for the channel contention. When the first device actually transmits the second scheduling signaling and indicates the second LBT, this method can accurately work; when the first device actually transmits the second scheduling signaling and indicates the first LBT, a capability of channel contention of the second device is reduced according to this method, but it can be implemented that the second device friendly coexists with other devices. Alternatively, when the second scheduling signaling is not received, it is assumed that the UE can obtain a start timing of the data transmission of the first device through another method, e.g., indication information in another piece of control signaling. Thus, if a length of the total time from a start point when the first device completes the LBT channel contention to a subframe for the scheduled data transmission of the second device is less than or equal to the MCOT, the second device performs the first LBT; otherwise, the second device performs the second LBT. Alternatively, when the second scheduling signaling is not received, it is assumed that the UE can obtain the start timing of the data transmission of the first device through another method, e.g., the indication information of another piece of control signaling. Thus, if the length of the total time from the start point when the first device completes the LBT channel contention to the subframe for the scheduled data transmission of the second device is less than or equal to the MCOT and the data transmission of the first device and the scheduled data transmission of the second device occupies consecutive subframes, the second device performs the first LBT; otherwise, the second device performs the second LBT.

According to this method, when the first device transmits the first scheduling signaling, the relatively conservative second LBT is set for the data transmission of the second device which is not accurately determined within the MCOT. For example, if the length of the total time from the start point when the first device completes the LBT channel contention to the subframe for the scheduled data transmission of the second device is less than or equal to the MCOT, the first LBT is set; or if the length of the total time from the start point when the first device completes the LBT channel contention to the subframe for the scheduled data transmission of the second device is less than or equal to the MCOT and the first device can ensure that the data transmission of the first device and the scheduled data transmission of the second device occupy consecutive subframes, the first LBT is set; or, the entire scheduled uplink transmission is set to use the second LBT in the first scheduling signaling. Thus, only when the second scheduling signaling is used in some conditions, i.e., a certain subframe configured with the second LBT is actually within the MCOT, the second scheduling signaling needs to be transmitted, which is used to adjust the LBT to the relatively aggressive first LBT. By using the method, since the LBT is only changed from the second LBT to the first LBT according to the second scheduling signaling, the corresponding parameter of the second LBT does not need to be indicated in the second scheduling signaling. Thus, when the second device does not receive the second scheduling signaling, regardless which method is used, i.e., according to the first scheduling signaling or by fixedly using the second LBT, it can be achieved that the second device performs the channel contention according to the second LBT, so as to implement friend coexistence with other devices.

A second method for determining the LBT mechanism for the data transmission of the second device includes that, at block 601, the first device transmits the first scheduling signaling which does not indicate the LBT mechanism needed to be used for the second device; next, at block 602, the first device may configure the LBT mechanism of the data transmission of the second device by transmitting the second scheduling signaling. If the second scheduling signaling needs to indicate the second LBT, the second scheduling signaling needs to further indicate the parameter of the second LBT, which may include the size of the CW of the CAT4 and/or the random number N generated by the first device based on the CW. The random number N is the number of the idle CCA slots needed to be detected when the CAT4 is performed.

After receiving the first scheduling signaling, the second device still needs to detect the second scheduling signaling. When receiving the second scheduling signaling, the second device performs the channel contention according to the LBT information indicated by the second scheduling signaling. When not receiving the second scheduling signaling, the second device may fixedly use a certain LBT mechanism to perform the channel contention, e.g., for friend coexistence, the second device may perform the relatively conservative second LBT for the channel contention. In some conditions, when needing to configure the second device to work according to the second LBT, the first device may not transmit the second scheduling signaling, so as to reduce signaling overhead. When the first device actually transmits the second scheduling signaling to indicate the second LBT, this method can accurately work; when the first device actually transmits the second scheduling signaling to indicate the first LBT, according to this method, a capability of channel contention of the second device is reduced, but the second device can friendly coexist with other devices. Alternatively, when the second scheduling signaling is not received, it is assumed that the UE can obtain the start timing of the data transmission of the first device according to another method, e.g., the indication information of another piece of the control signaling. Thus, if the length of the total time from the start point when the first device completes the LBT channel contention to the subframe for the scheduled data transmission of the second device is less than or equal to the MCOT, the second device performs the first LBT; otherwise, the second device performs the second LBT. Alternatively, when the second scheduling signaling is not received, it is assumed that the UE can obtain the start timing of the data transmission of the first device through another method, e.g., the indication information of another piece control signaling. Thus, if the length of the total time from the start point when the first device completes the LBT channel contention to the subframe for the scheduled data transmission of the second device is less than or equal to the MCOT and the data transmission of the first device and the scheduled data transmission of the second device occupy consecutive subframes, the second device performs the first LBT; otherwise, the second device performs the second LBT. In some conditions, if an action of the second device which does not receive the second scheduling signaling is the LBT mechanism which the first device wants to set, the first device may not transmit the second scheduling signaling, so as to reduce signaling overhead.

For the two methods for determining a LBT mechanism of data transmission of a second device, since the LBT category applying to the data transmission of the second device may vary with time, if the first device frequently change uplink and downlink transmission distribution, the first device may need to transmit a new second scheduling signaling to change a LBT category indicated by a previous second scheduling signaling. For the second device, when receiving multiple pieces of second scheduling signaling, the second device may work according to the LBT category indicated by the latest second scheduling signaling. Alternatively, the first device is allowed to transmit the second scheduling signaling at multiple times, but it is limited that the LBT categories respectively indicated by pieces of second scheduling signaling transmitted at multiple times are same. If the LBT categories indicated by the multiple pieces of the second scheduling signaling are collided with each other, the second device determines that reception of the second scheduling signaling fails, i.e., the second device performs processing according to the condition that the second scheduling signaling is not received.

Embodiment 2

In an unlicensed frequency band, when a device works on two or more neighbor carriers, since frequency intervals among the carriers are small, a transmitting operation on a carrier may impact a receiving operation of the same device on a neighbor carrier. In particular, for the transmitting operation on the carrier, the power leaked to the neighbor carrier may impact a CCA operation on the neighbor carrier, i.e., even though the neighbor carrier is idle now, because of the leaked power, the device may wrongly determines that the neighbor carrier is busy, thus, cannot occupy the carrier. In an existing downlink LAA operation, the processing in this condition includes that transmitting operations on these neighbor carriers are started as simultaneously as possible. For example, CAT4 LBT may be respectively performed on each carrier. However, a base station may perform a Self-Defer process after successfully completing the LBT on the carrier, and starts the transmitting operations after more carriers completes the LBT. The Self-Defer process provides an occurrence for the base station to simultaneously transmit data on multiple carriers. However, during the Self-Defer process on a carrier, the carrier may be preempted by another device, which causes that the base station loses the occurrence to use the carrier. Thus, the base station has to perform a compromise between the two factors. According to the method above, when the base station starts data transmission on a part of the neighbor carriers and there still are other neighbor carriers where the LBT is not completed, the base station has to pause the LBT process on these neighbor carriers, i.e., these neighbor carrier are unusable now.

In the LAA system, a similar problem still exists in the uplink operation of the UE, i.e., the UE cannot perform the transmission operation and the reception operation simultaneously on carriers the frequency interval of which is small. Actually, regarding a cost factor, UE complexity is usually lower than base station complexity, thus, the problem that transmission and reception cannot simultaneously performed on neighbor carriers may be more obvious at the UE side. Since the capability that the UE performs the simultaneous transmission and reception on the neighbor carriers is lower than that capability of the base station, it is caused that the base station may perform the transmission and the reception without interference on two carriers while the transmission and the reception performed by the UE on the two carriers are actually limited.

For example, the base station schedules the downlink transmission of the UE on a carrier, but simultaneously schedules the uplink transmission of the UE on another neighbor carrier, which causes that the uplink transmission on one of the two carriers interferes with the downlink reception on the other carrier. For example, if the UE is transmitting uplink data on a carrier and the base station schedules uplink data transmission on the neighbor carrier, since the CCA of the UE on the neighbor carrier may be impacted by the carrier where the uplink data has been transmitted, it causes that the UE cannot complete the CCA on the neighbor carrier, the uplink transmission is not started, and the uplink resource is wasted. For example, even though the base station performs scheduling in a same subframe on two neighbor carriers to start the transmission, since the LBTs of the two carriers are independently performed, if times when the LBTs are respectively completed on the two carriers are not same, it may cause that the CCA operation on another carrier is prevented, wherein since the two neighbor carriers belong to different timing advance groups (TAG) or the channel occupancy signal is transmitted on a carrier which blocks the operation of another carrier.

In order to avoid the problem above, FIG. 8 is a flowchart illustrating a method for performing scheduling and uplink transmission on multiple carriers according to the present disclosure.

At block 801, the UE may report a capability of simultaneous transmission and reception on neighbor carriers to the base station, so that the base station may properly allocate an uplink resource and a downlink resource for the UE according to the capability information. The UE may only report a capability of simultaneous transmission and reception which applies to various combinations of channels and/or signaling of transmission and reception. Alternatively, since the capability of resisting the interference leaked from the uplink transmission on the neighbor carrier may be different when the UE performs different types of reception operations, e.g., the downlink data reception operation and the CCA operation, the UE may respectively report capabilities of simultaneous transmission and reception for different combinations of channels and/or signaling of transmission and reception, e.g., a capability regarding that the uplink transmission interferes with the downlink data reception on another carrier, and a capability regarding that the uplink transmission interferes with the uplink CCA on another carrier.

Methods that a UE reports a capability of simultaneous transmission and reception on multiple carriers are described as follows.

A first method includes the UE may not perform a transmission operation and a reception operation simultaneously on various carriers in a same frequency band, when the UE supports CA on multiple frequency bands, the UE reports a frequency band combination which is supported by the UE and for which the limitation for simultaneous transmission and reception does not exist, i.e., in this frequency band combination, the uplink signaling may be transmitted on a carrier in a frequency band simultaneously when the reception operation may be performed on a carrier in another frequency band. Herein, a combination may include one or more frequency bands, which are usually not overlapped, and a frequency interval of which is large, thus the simultaneous transmission and reception may be performed. Alternatively, when the UE supports the CA on multiple frequency bands, the UE reports a frequency band combination for which the limitation of the simultaneous transmission and reception exists, i.e., when the UE is configured with the frequency bands, it may be avoided that the uplink signaling is performed on a carrier in a frequency band, and the reception operation is performed on a carrier in another frequency band. Herein, a combination may include one or more frequency bands which may be overlapped, or the frequency interval of which is small, thus, the UE cannot perform the simultaneous transmission and reception on the frequency bands.

A second method includes that the UE reports a frequency interval threshold $T_F$, two carriers the frequency interval between which is less than $T_F$, regardless whether they belong to a same frequency band or different frequency bands, the UE may not perform the simultaneous transmission and the reception on the two carriers.

A third method includes that the UE cannot perform transmission operation and reception operation simultaneously on various carriers in a same frequency band, when the UE supports CA on multiple carriers (i.e., inter-band CA), the UE reports the frequency interval threshold $T_F$, thus, the UE may not perform the simultaneous transmission and the reception on two carriers if the two carriers belong to different frequency bands and the frequency interval between the two carriers is smaller than $T_F$.

When the UE respectively reports the capability of simultaneous transmission and reception for different combinations of channels and/or signaling of transmission and reception, the UE may report the capability of simultaneous transmission and reception for each combination of channels and/or signaling of transmission and reception according to the three methods above. For example, the capability of simultaneous transmission and reception for multiple carriers regarding that the uplink transmission interferes with the downlink data reception on another carrier, and the capability of simultaneous transmission and reception for multiple carriers regarding that the uplink transmission interferes with the uplink CCA on another carrier.

At block 802, the UE receives signaling for scheduling uplink transmission on one or more carriers from the base station.

At block 803, the UE performs the uplink LBT according to the scheduling of the base station, and performs the uplink transmission on one or more carriers where the LBT is successfully performed.

According to the capability reported by the UE, if the UE performs the uplink transmission on a carrier, the base station may avoid to schedule the downlink data transmission of the UE on a neighbor carrier, so as to avoid resource waste. On the UE side, it is assumed that the UE is performing uplink transmission on a carrier, in a cross-carrier scheduling condition, if the UE detects that the base station schedules its downlink data transmission on a neighbor carrier, the UE may skips the data reception, and directly feeds NACK back to the base station as HARQ-ACK information; or the UE may receive the downlink data, and does not perform the uplink transmission.

If SRS transmission of the UE is triggered in a subframe, methods that the UE processes the uplink and downlink transmission in this subframe are described. A first method is that the UE regards that this subframe must be processed as the uplink subframe, thus, the UE does not detect the PDCCH/EPDCCH on multiple neighbor carriers in this subframe, and does not receive the downlink transmission from the base station. Alternatively, a second method includes that the UE regards that this subframe may be a partial downlink subframe, i.e., similar as DwPTS, thus, the UE continues to detect common PDCCH and PDCCH/EPCCH on the multiple neighbor carriers in this subframe. If the UE detects the common PDCCH on one or more neighbor carriers and the common PDCCH indicates an entire downlink subframe, or the common PDCCH indicates the partial downlink subframe but there is no enough GP between the OFDM symbol in the partial downlink subframe and the SRS symbol, and the UE further detects the downlink transmission on the neighbor carrier scheduled by the base station for the UE, the UE may abandon the SRS transmission, and may receive the downlink data on the neighbor carrier where the downlink transmission is scheduled for the UE; alternatively, the UE may abandon the downlink transmission in the entire downlink subframe on the carrier without enough GP, performs downlink reception on the carrier with enough GP between the downlink OFDM symbol in the partial downlink subframe indicated by the common PDCCH and the SRS symbol, and transmits the triggered SRS; alternatively, the UE may only performs the downlink reception on the OFDM symbol in a first part of the subframe, performs the downlink reception on the carrier with the enough GP between the downlink OFDM symbol in the partial downlink subframe indicated by the common PDCCH and the SRS symbol, and transmits the triggered SRS. If the UE detects the common PDCCH on one or more neighbor carriers and only detects the downlink transmission scheduled for the UE by the base station on the neighbor carrier in the partial downlink subframe indicated by the common PDCCH, and there are the enough GP between the downlink OFDM symbol in the partial downlink subframe indicated by the common PDCCH and the SRS symbol, the UE may firstly receive the downlink data on the multiple neighbor carriers above, and then may transmit the triggered SRS. If the UE detects the common PDCCH on one or more neighbor carriers and the base station may not schedule the downlink transmission for the UE, the UE may transmit the trigger SRS. Alternatively, on the carrier where the SRS is triggered, once the common PDCCH indicates that there is the GP between the downlink OFDM symbol in the partial downlink subframe indicated by the common PDCCH and the SRS symbol, the UE transmits the triggered SRS.

For the LBT operation performed by the UE on the unlicensed frequency band, in a condition that CAT4 is used, a CAT4 related status and a CAT4 related parameter may be maintained at the base station, or may be maintained at the UE side. In the method that the base station maintains the CAT4 related parameter, the base station needs to notify the used CAT4 parameter to the UE through physical layer signaling; in the method that the UE maintains the CAT4 related parameter, the base station does not need to indicate the CAT4 parameter. For example, the CAT4 related parameter may include a size of a CW of CAT4 and/or a random number N generated based on the CW by the first device, etc. The random number N is the number of idle CCA slots to be detected when the CAT4 is performed. In a condition that the uplink transmission interferes with the CCA operation on the neighbor carrier, the methods according to the present disclosure are respectively described according to some conditions.

Carriers of the UE may be divided into groups, and the LBT is respectively performed for each group of carriers. A method for determining a LBT mechanism and a related parameter of a group of carriers according to the present disclosure is described below. The group of the carriers above may be all uplink carriers configured for the UE; or the group of the carriers above may be carriers which are configured for the UE and belong to a same TAG; or the group of the carriers may be carriers which are configured to the UE and belong to a same frequency band; or it is assumed that the UE is configured with carriers on multiple frequency bands and the UE does not support simultaneous transmission and reception, and the group of the carriers above includes various carriers configured for the UE on the multiple frequency bands; or the group of the carriers above may include a part of carriers in all uplink carriers configured for the UE. The method that the carriers are divided into groups may not need additional signaling indication, e.g., first four group dividing methods above; or the group dividing methods may need the additional signaling indication, e.g., the fifth group dividing method. The LBT operation may be processed for a group of carriers configured above, or the LBT operation may be only processed for an active carrier in the group of the carriers configured above. The group of the carriers above may occupy neighbor frequencies, thus, the transmission operation and the reception operation performed in this group of carriers by the UE may be interacted among each other.

In a first method for processing LBT of a group of carriers, for the group of the carriers above, the CAT4 related parameter of each carrier may be respectively maintained, which includes the size of the CW, etc. The base station may respectively determine and indicate the LBT mechanism of each carrier where the uplink transmission is scheduled, if the LBT mechanism is CAT4, the CAT4 related parameter may be further determined and indicated. The CW parameter of each carrier may be indicated for the carrier, or a maximum value of CWs of various carriers in the group of the carriers may be obtained, and the maximum value of the CWs may be indicated for each carrier. Alternatively, the UE may maintain the CAT4 parameter. For example, according to the method in Embodiment 1, the uplink LBT mechanism may be determined according to whether the uplink data transmission is within the MCOT of the base station.

In a second method for processing LBT of a group of carriers, for the group of the carriers, the CAT4 may be performed on a carrier, and the CAT2 may be performed on other carriers. For the carrier where the CAT4 is performed, the base station may dynamically indicate the CAT4 related parameter of this carrier. Alternatively, the UE may maintain the CAT4 related parameter. The CAT4 related parameter may be determined according to parameters of all carriers in the group of the carriers, such as CWs, e.g., using a maximum value of CWs of various carriers, or maintaining only one CW value for the various carriers. Alternatively, the CAT4 related parameter may be determined according to the CW of the carrier where the uplink transmission is actually scheduled now in the group of the carriers, e.g., using a maximum value of CWs of the various carriers, or maintaining only a CW value for the various carriers. When each carrier respectively maintains a CW, for the carrier where the CAT4 is configured to be performed, its CW parameter may be fixedly used to determine the CAT4 parameter currently used, or its CW parameter may be used to determine the CAT4 parameter currently used only when the uplink transmission is scheduled. Alternatively, for a carrier in a group of carriers, if the uplink transmission is actually scheduled on this carrier and the scheduled uplink transmission is outside the MCOT on the carrier of the base station, the parameter of the carrier, such as the CW, may be used to determine the CAT4 related parameter. For the carrier where the CAT4 is configured to be performed, the CW parameter may be fixedly used to determine the CAT4 parameter currently used, or only when the uplink transmission is scheduled and the scheduled uplink transmission is outside the MCOT on the carrier of the base station, its parameter is used to determine the CAT4 parameter currently used.

The carrier where the CAT4 is configured to be performed may be configured for the UE through higher layer signaling. The base station may only need to dynamically indicate the CAT4 related parameter of this carrier, or the CAT4 parameter may be maintained by the UE, and the CAT2 may be used on another carrier in default. Alternatively, the base station may respectively indicate the LBT mechanism of each carrier in the group of the carriers, for the CAT4 carrier, the CAT4 related parameter is further indicated, or the UE may maintain the CAT4 parameter. When the uplink transmission on the group of the carriers above needs to be scheduled, the base station may at least schedule the uplink transmission on the carrier where the CAT4 is configured to be performed, so that the UE may perform the CAT4 on this carrier, and may perform the CAT2 on another scheduled carrier. Alternatively, when the uplink transmission needs to be scheduled on the group of the carriers, it is allowed that the base station may schedule the uplink transmission on the carrier where the CAT4 is not semi-statically configured to be performed in a subframe, but the base station still needs to dynamically indicate the CAT4 related parameter of this carrier, alternatively, the UE maintains the CAT4 related parameter, thus, the UE still performs the CAT4 on this configured carrier, and performs the CAT2 on another scheduled carrier.

On the carrier where the CAT4 is configured to be performed through the higher layer signaling, only the CAT4 is configured to be performed on this carrier at each time when the uplink transmission is scheduled; alternatively, it is allowed that the base station dynamically indicates to perform the CAT2 in a subframe for the carrier configured to perform the CAT4. For example, it is assumed that according to the method in Embodiment 1, the uplink transmission on all carriers scheduled by the base station is within the MCOT, thus, the base station may dynamically indicate the UE to perform the CAT2 on the carrier configured to perform the CAT4, and the CAT2 is performed on another carrier where the uplink transmission of the UE is scheduled; when the uplink transmission on at least one carrier is outside the MCOT, the base station may dynamically indicate the UE to perform the CAT4 on the carrier where the CAT4 is configured to be performed. On the carrier where the CAT4 is configured to be performed through the higher layer signaling, at each time when the uplink transmission is scheduled, the UE only performs the CAT4 on this carrier, and performs CAT2 on another carrier. Alternatively, in a subframe satisfying some conditions, it is allowed that the UE performs the CAT2 on the carrier where the CAT4 is configured to be performed, and also performs the CAT2 on another carrier. When the base station indicates the CAT2 for the uplink transmission scheduled on all carriers in the group of the carriers, the UE may perform the CAT2 on the carrier where the CAT4 is configured to be performed; otherwise, the UE performs the CAT4 on the carrier where the CAT4 is configured to be performed. In particular, in a subframe, if the base station indicates the CAT2 on the carrier configured with the CAT4 but indicates the CAT4 on at least one another carrier in the group, the UE performs the CAT4 on the carrier configured with the CAT4.

The carrier configured to perform the CAT4 may be selected by the base station, but does not need to be configured for the UE through the higher layer signaling. The base station above may semi-statically select the carrier where the CAT4 is performed. Alternatively, if the UE maintains the CAT4 status and the CAT4 parameter, the carrier configured to perform the CAT4 may be selected by the UE, and the carrier where the CAT4 is performed may be semi-statically selected. In the method that the base station maintains the CAT status and the CAT parameter, if it is allowed that the base station selects different carriers for different UEs as carriers where the CAT4 is performed, information of the carrier where the CAT4 is performed indicated by the base station for the UE may be respectively transmitted to each UE. A LBT category of each subframe where the uplink transmission is scheduled by the base station may be common in a cell, or may be common for a pair of UEs, or may be respectively transmitted to each UE. When the uplink transmission needs to be scheduled on the group of the carriers above, the base station may schedule the uplink transmission at least on the carrier selected by the base station to perform the CAT4, and may dynamically indicate the CAT4 and the related parameter, so as to indicate the UE to perform the CAT4 on the carrier selected by the base station to perform the CAT4 and to indicate the UE to perform the CAT2 on another scheduled carrier.

Alternatively, the base station may respectively indicate the LBT mechanism for each carrier in the group of the carriers, may further indicate the CAT4 related parameter for the CAT4 carrier.

On the carrier selected to perform the CAT4, at each time when the uplink transmission is scheduled, only the CAT4 is configured to be performed on this carrier; alternatively, it is allowed that the base station dynamically indicate that the CAT2 is performed in a subframe on the carrier selected to perform the CAT4. For example, it is assumed that according to the method in Embodiment 1, in the current subframe, the uplink transmission on all carriers scheduled by the base station is within the MCOT, and the base station dynamically indicates the UE to perform the CAT2 on the carrier selected to perform the CAT4, and the CAT2 is also performed on another carrier where the uplink transmission is scheduled for the UE; when the uplink transmission on at least one carrier is outside the MCOT, the base station may dynamically indicate the UE to perform the CAT4 on the carrier selected to perform the CAT4. On the carrier selected to perform the CAT4, at each time when the uplink transmission is scheduled, the UE only performs the CAT4 on the carrier, and performs the CAT2 on another carrier. Alternatively, in a subframe which satisfies some conditions, it is allowed that the UE performs the CAT2 on the carrier selected to perform the CAT4, and also performs the CAT2 on another carrier. When the base station indicates the CAT2 for the uplink transmission scheduled on all carriers in the group of the carriers, the UE may perform the CAT2 on the carrier selected to perform the CAT4; otherwise, the UE performs the CAT4 on the carrier selected to perform the CAT4. In particular, in a subframe, if the base station indicates the CAT2 on the carrier selected for the CAT4, but indicates the CAT4 on at least one another carrier in the group of the carriers, the UE performs the CAT4 on the carrier selected to perform the CAT4.

Alternatively, it may be allowed that the base station dynamically selects the carrier where the CAT4 is performed. The dynamical selection may be related with implementation of the base station, or the base station is required to randomly select the CAT4 carrier according to uniform distribution. For example, the CAT4 carrier selection operation may be performed at each time when the uplink data is scheduled in a subframe; or the base station may be required to perform the CAT4 carrier selection operation after each time of completing the downlink transmission and before starting the uplink transmission. In particular, the base station may select a carrier to be configured to perform the CAT4 according to the uplink carrier of the UE currently scheduled, the base station further needs to dynamically indicate the carrier and the CAT4 related parameter, and configures another carrier to perform the CAT2. Alternatively, the base station may respectively indicate the LBT mechanism for each carrier in the group of the carriers, and may further indicate the CAT4 related parameter for the CAT4 carrier. Further, in a subframe, it is also allowed that the base station dynamically indicates all carriers where the uplink transmission of the UE is scheduled to perform the CAT2. For example, it is assumed that according to the method in Embodiment 1, in the current subframe, the uplink transmission on all carriers scheduled by the base station is within the MCOT, thus, the base station may dynamically indicate the UE to perform the CAT2 on the carrier selected to perform the CAT4 and also to perform the CAT2 on another carrier where the uplink transmission is scheduled. Accordingly, on the carrier where the CAT4 is indicated to be performed by the base station, the UE may only perform the CAT4 at each time when the uplink transmission is scheduled, and may perform the CAT2 on another carrier. Alternatively, in a subframe which satisfies some conditions, it is allowed to the UE to perform the CAT2 on the carrier selected to perform the CAT4 in the subframe above, and also performs the CAT2 on another carrier. When the base station indicates the CAT2 on all carriers where the uplink transmission is scheduled, the UE may perform the CAT2 on the carrier selected to perform the CAT4; otherwise, the UE may perform the CAT4 on the carrier selected to perform the CAT4. In particular, in the subframe, the base station indicates the CAT2 on the selected CAT4 carrier but indicates the CAT4 on at least one another carrier in the group of the carriers, the UE performs the CAT4 on the carrier selected to perform the CAT4.

Alternatively, the UE may be allowed to dynamically select the carrier where the CAT4 is performed. The dynamic selection above may be related with the implementation of the UE, or the UE is required to randomly select the CAT4 carrier according to uniform distribution. For example, the CAT4 carrier selecting operation may be performed at each time when the uplink data is scheduled in a subframe; or may be performed at each time when the base station starts to schedule the uplink transmission. In particular, the UE may select a carrier to be configured to perform the CAT4 according to the uplink carrier currently scheduled, the UE maintains and generates the CAT4 related parameter, and performs the CAT2 on another carrier. Alternatively, in a subframe which satisfies some conditions, it is allowed that the UE performs the CAT2 in the subframe on the carrier selected to perform the CAT4, and also performs the CAT2 on another carrier. When the base station indicates the CAT2 on all carriers where the uplink transmission is scheduled in the group of the carriers, the UE may perform the CAT2 on the carrier selected to perform the CAT4; otherwise, the UE performs the CAT4 on the carrier selected to perform the CAT4. In particular, in the subframe, the base station indicates the CAT2 on the selected CAT4 carrier but indicates the CAT4 on at least one another carrier in the group of the carriers, the UE performs the CAT4 on the carrier selected to perform the CAT4.

It is assumed that the carriers configured for the UE are divided into multiple groups, and the LBT is performed for each group of carriers according to the method above. The base station may configure the grouping information of the group of the carriers where the LBT is performed for the UE through the higher layer signaling, e.g., which component carrier is included in the group of the carriers. For example, in the second method for processing LBT of a group of carriers, if the carrier where the CAT4 is performed in the group of the carriers is further configured through the higher layer signaling, the base station only needs to dynamically indicate the CAT4 related parameter of the carrier configured to perform the CAT4, or the UE maintains the CAT4 related parameter; if the carrier where the CAT4 is performed in the group of the carriers is not configured through the higher layer signaling, the base station needs to dynamically indicate the carrier configured to perform the CAT4, the base station may further indicate the CAT4 related parameter of the carrier configured to perform the CAT4, or, the UE maintains the CAT4 related parameter. Thus, the UE exactly determines the carrier where the CAT4 is performed and the corresponding CAT4 parameter, and determines that the CAT2 is performed on another carrier. For example, in the first method for processing LBT of a group of carriers, it is assumed that the base station respectively indicates the LBT mechanism for each carrier, but the UE maintains the CAT4 related parameter and processes the LBT based on a maximum value of CWs of various carriers in the group of the carriers. Alternatively, the base station may not configure the grouping information of the group of carriers where the LBT is performed through the higher layer signaling, i.e., the UE may work on these carriers in default according to the LBT mechanism and/or the parameter indicated by the base station. For example, in the first method for processing the LBT in the group of the carriers, the base station respectively indicates the LBT mechanism for each carrier where the uplink transmission is scheduled by using another piece of signaling, e.g., dynamic control information in physical layer, and may further indicate the CAT4 related parameter for each CAT4 carrier, or the UE maintains the CAT4 related parameter, and respectively uses the corresponding CW parameter of each carrier.

In particular, the base station may divide the carriers configured for the UE into groups, and may use a different LBT processing method for each group of carriers. For a group of carriers, according to the first method for processing the group of the carriers, if the base station respectively indicates the LBT mechanism for each carrier and further respectively indicates the CAT4 related parameter for each CAT4 carrier, or, if the UE maintains the CAT4 related parameter and respectively uses a corresponding CW parameter for each carrier, the base station may not indicate the grouping information of the group of the carriers, i.e., the UE may in default work according to the LBT mechanism and/or the parameter indicated by the base station on these carriers. Otherwise, for the group of the carriers, according to the first method for processing the LBT of the group of the carriers, it is assumed that the base station respectively indicates the LBT mechanism, but the UE maintains the CAT4 related parameter, and processes the LBT based on the maximum value of the CWs of the various carrier in the group of the carriers; or, according to the second method for processing the LBT of the group of the carriers; or; the base station needs to indicate the grouping information of the group of the carriers for the UE.

It is assumed that the base station schedules the uplink transmission on multiple carriers in a same TAG, the LBT categories of the multiple carriers may be different from each other, or the CAT4 parameters of the multiple carriers may be different from each other. It is assumed that the a detail method for uplink CAT4 includes that the UE performs the Self-Defer process after completing the CAT4 LBT, and the UE may perform the uplink transmission when the UE detects an idle channel in a time period T0 us, e.g., T0 is equal to 25 us, before the UE starts to schedule the uplink transmission. As shown in FIG. 9, on the multiple carriers which are in the same TAG and where the uplink transmission is scheduled, the UE may respectively work according to the LBT mechanism indicated by the base station, thus, the UE may perform the uplink transmission on one or more carriers where the LBT operation is successfully completed. Alternatively, on the multiple carriers which are in the same TAG and where the uplink transmission is scheduled, the UE may compete a channel based on the CAT4 on the carrier configured to perform the CAT4, or on the carrier indicated by the base station to perform the CAT4, or on the carrier selected by the UE to perform the CAT4, and may perform the CAT2 on another scheduled carrier, so as to perform the uplink transmission on one or more carriers where the LBT operation is successfully completed. Regarding two factors, i.e., the multiple carriers are in the same TAG and a channel occupying signal is not transmitted after the CAT4 is successfully completed, it is ensured that the UE starts uplink transmissions simultaneously on the multiple carriers in the TAG.

Alternatively, it is assumed that the detail method for uplink CAT4 includes that: after the CAT4 LBT is completed, the UE may transmit a channel occupancy signal before the start timing for the scheduled uplink transmission, and then transmits the scheduled uplink signal. Thus, when the UE completes the CAT4 on one of the neighbor carriers, if the channel occupancy signal is immediately started to be transmitted, it must impact the LBT operation of the UE on another neighbor carrier. In this condition, the UE may perform the Self-Defer process after performing the CAT4 on a carrier, and may start to transmit the channel occupancy signal and the scheduled uplink signal together after more carriers complete the LBT. It is assumed that the base station schedules the uplink transmission of the UE on N carriers, the UE may be limited to try to complete the LBT on carriers as many as possible, i.e., before the start time of scheduling the uplink transmission arrives, once the LBT does not success on any scheduled carrier but still may be possibly success, the UE performs the Self-Defer process on all other carriers where the LBT operation has been completed. When the LBT for all carriers is completed, the UE transmits the channel occupancy signal and the scheduled uplink signal on each scheduled carrier; or, when the LBT being performed on the carrier is not possible to be completed, the UE may transmits the channel occupancy signal and the scheduled uplink signal on all carriers where the LBT has been completed. Alternatively, it is allowed that the UE may start to transmit the channel occupancy signal and the scheduled uplink signal after the LBT has been completed on a certain proportion of carriers. This proportion may be pre-defined, or may be configured by the higher layer signaling, or may be determined through UE implementation. According to the UE implementation, in T0 us before the CAT4 is completed on a last carrier, the CCA detection is started on carrier(s) where the CAT4 is completed in advance, thus, on all other carriers where CAT4 is performed T0 us in advance, the CCA is just completed when the CAT4 is completed on the last carrier, thus, the UE may perform the uplink transmission simultaneously on all carriers where the CAT4 is completed.

It is assumed that the base station configures that the uplink carriers of the UE belong to multiple TAGs, when the base station configures the carriers of the UE through the higher layer signaling, the frequency interval between carriers belonging to different TAGs is large enough, so as to avoid the problem that the UE cannot perform simultaneous transmission and reception on carriers in different TAGs. Alternatively, when the base station configures the carriers of the UE through the higher layer signaling, the base station may configure that different TAGs may include carriers the frequency interval of which is close to each other, but the base station may not activate the carriers which belong to different TAGs and the frequency interval of which is not large enough, thus, the problem is avoided that the UE cannot perform the simultaneous transmission and the reception on carriers in different TAGs.

However, in some conditions, since the available uplink carrier is limited, the base station may not absolutely ensure that the frequency interval of the carriers configured and activated in different TAGs is large enough, which causes impaction for uplink and downlink scheduling and uplink and downlink transmission of the UE. According to the capability of simultaneous transmission and reception on multiple carriers, the base station may avoid to schedule the uplink and downlink transmission of the UE on two carriers respectively belonging to different TAGs and the frequency interval of which is not large enough. In some conditions, if the base station schedules the uplink and downlink transmission on two carriers respectively belonging to different TAGs and the frequency interval of which is not large enough, and the transmission and the reception on the two carriers interfere with each other, there are two processing methods described as follows.

In a first processing method, as shown in FIG. 10, for a carrier in a TAG with a later timing, the UE may transmit a channel occupancy signal A until a start timing of the uplink transmission scheduled on the carrier, and the start timing of the signal A is aligned with a start timing of the uplink transmission on the scheduled carrier in a TAG with an earlier timing. For the carrier in the TAG with the later timing, since the channel occupancy signal A is additional added, a time period used for performing the LBT mechanism is reduced. In particular, if the base station indicates that the CAT2 is used, the CCA detection of the CAT2 is actually completed in a time period T1 before the start timing of the channel occupancy signal A, e.g., T1 is equal to 25 us. If the base station indicates that the uplink CAT4 LBT is used and the UE performs the Self-Defer process after the CAT4 LBT is completed, when the UE detects the channel is idle in T0 us before the start timing of the channel occupancy signal A, e.g., T0 is equal to 25 us, the UE performs the uplink transmission on the carrier. According to the method above, the channel occupancy signal A is added for the uplink transmission on the carrier which belongs to the TAG with the later timing and where the reception operation is impacted, or the channel occupancy signal A is added for the uplink transmission on all carriers in the TAG with the later timing.

In a second processing method, as shown in FIG. 11, for the carrier in the TAG with the earlier timing, a former part of the scheduled uplink transmission is dropped, so as to make alignment with the start timing of the carrier in the TAG with the later timing. Since a part of the uplink transmission scheduled on the carrier in the TAG with the earlier timing is dropped, the time period when the scheduled uplink transmission is dropped may be used for the CCA detection, thus, the time period for performing the LBT mechanism is increased. In particular, if the base station indicates that the uplink CAT2 LBT is used, the CCA detection of the CAT2 is actually completed in a time period T1 before the start timing of the scheduled uplink transmission in the TAG with the later timing, e.g., T1 is equal to 25 us. If the base station indicates that the CAT4 LBT is used and the UE performs the Self-Defer process after completing the CAT4 LBT, when the UE detects that the channel is idle in T0 us before the start timing of the scheduled uplink transmission in the TAG with the later timing, e.g., T0 is equal to 25 us, the UE performs the uplink transmission in the carrier. According to this method, a part of the signal of the uplink transmission which is on the carrier in the TAG with the earlier timing and impacts the reception operation is dropped, or a part of the signal of the uplink transmission on all carriers in the TAG with the earlier timing is dropped.

Embodiment 3

On a carrier in an unlicensed frequency band, depending on scheduling of a base station, a UE may perform CAT2 LBT or CAT4 LBT to perform channel contention, and starts uplink transmission after successfully completing the LBT. For the CAT2, if only detecting idle in T1 us before the uplink transmission is started, e.g., T1 is equal to 25 us, the UE may occupy the channel. For the CAT4, a random number N is generated according to a size of a current CW, after detecting that the channel is idle in T2 us, e.g., T2 is equal to 25 us, the UE continues to detect the channel, when the number of the CCA slots currently in idle reaches to N, the UE may occupy the channel. After the UE successfully completes the CAT4, there are two processing methods, a first method includes a filling signal for channel occupancy is immediately transmitted until the start timing of the scheduled uplink transmission, and starts to transmit the scheduled uplink signal. A second method includes that a Self-Defer process is performed, and when the UE detects that the channel is in idle in T0 us before the start timing of the scheduled uplink transmission, e.g., T0 is equal to 25 us, the UE may transmits the scheduled uplink signal.

According to the second processing method for completing the CAT4, as shown in FIG. 12*a*, a completion time of the CAT4 and an idle time period T0 us may be not overlapped; or as shown in FIG. 12*b*, when the UE completes the CAT4, a time interval to the start timing of the scheduled uplink transmission is less than T0 us, i.e., the time period used for performing the CAT4 and the time period T0 us is overlapped.

For the condition in FIG. 12*a*, as shown in FIG. 13, the idle time period T0 us may be divided into a former 16 us and a sequent consecutive k idle CCA slots, e.g., k is equal to 1, a length of the CCA slot is 9 us. A former part of the time period 16 us includes an idle CCA slot.

For the condition as shown in FIG. 12*b*, although the time period T0 us and the time period of the CAT4 are overlapped, according to a structure of the time period T0 us as shown in FIG. 13, it may still be required that each CCA slot in the time period T0 us is idle. In particular, as shown in FIG. 14*a*, a first CCA slot in the time period T0 us is within the time period of the CAT4, thus, the first CCA slot is idle; a part of the time period T0, i.e., 7 us, is partially overlapped with a last CCA slot in the time period of the CAT4, since it is not required to perform the CCA detection in the part 7 us, it does not need to be limited; the last CCA slot in the time period T0 must be idle, thus, UE can perform the uplink transmission. As shown in FIG. 14*b*, the first CCA slot in the time period T0 is partially overlapped with the last CCA slot in the time period of the CAT4, after performing the CAT4, the UE needs to continue to perform the channel detection, so as to ensure that the first CCA slot is idle; there is no requirement to perform the CCA detection for the part 7 us in the time period T0; the last CCA slot in the time period T0 must be idle, so that the UE can perform the uplink transmission. As shown in FIG. 14*c*, the first CCA slot in the time period T0 is within the time period of the CAT4, thus, the first CCA slot is idle; there is no requirement to perform the CCA detection for the part 7 us in the time period T0; the last CCA slot in the time period T0 is partially overlapped with the last CCA slot in the time period of the CAT4, after completing the CAT4, the UE needs to continue to perform the channel detection, so as to ensure that the last CCA slot is idle, thus, the UE may perform the uplink transmission.

Alternatively, processing is respectively performed according to a relation of T0 and an interval T between a timing location when the UE successfully performs the CAT4 and the start timing when the uplink transmission of the UE is scheduled. When T is more than or equal to T0, i.e., the condition as shown in FIG. 12*a*, according to the method as shown in FIG. 13, when it is detected that the channel is idle in the time period T0 us, i.e., each CCA slot in the time period T0 is idle, the UE may start the uplink transmission. When T is less than T0, it may be required that the UE may occupy the channel to transmission uplink signal only after detecting that the channel is idle in the entire time period T. For example, any time point in the time period T is within a certain CCA slot, and the CCA slot needs to be idle. A time period before the start timing of the scheduled uplink transmission of the UE in the time period T0 us is successively divided two 9 us CCA slots, and the additional time jus in the time period T0 us needs to be taken as a part of another CCA slot to perform idle channel detection. As shown in FIG. 15, it is assumed that a penultimate CCA slot is partially overlapped with the time period of the CAT4, thus, the UE needs to detect whether the last CCA slot is idle, and whether the channel is idle in a part of the penultimate CCA slot which is not overlapped with the time period of the CAT4. Alternatively, when T is less than T0, it is may be required that the time period when the UE does not perform the CCA detection is no more than X us, e.g., X is equal to 7, and it is required that the channel may be occupied to transmit the uplink signal only after the UE detects that the channel is idle within entire other time period in the time period T. For example, the entire other time period in the time period T belongs to a CCA slot, and the CCA slot needs to be idle.

According to existing LAA standards, in the 9 us CCA slot, the device needs to perform detection at least in Tcca time, e.g., Tcca is equal to 4 us, when it is detected that energy is less than a CCA threshold, it is determined that the CCA slot is idle; otherwise, it is determined that the CCA slot is busy. When a CCA slot in the time period T0 and a CCA slot of the CAT4 is partially overlapped, a length of a total time period Tt after the two CCA slots are partially overlapped is more than Ts, e.g., Ts is equal to 9 us, at this time, it may be required that the UE performs the detection in a longer time period Tc in the time period Tt, i.e., Tc is more than Tcca, when it is detected that the energy is less than the CCA threshold, it is determined that the CCA slot is idle; otherwise, the CCA slot is busy. For example, Tc and Tt may be proportionally increased, e.g., $T_c = T_{cca} \cdot T_t / T_s$. Alternatively, when a CCA slot in the time period T0 and a CCA slot of the CAT4 are partially overlapped, it is required that the channel detection is performed at least in $2T_{cca}$, e.g., 8 us, in the total time period after the two CCA slots are overlapped. Alternatively, when the CCA slot in the time period T0 and the CCA slot of the CAT4 are partially overlapped, when the length of the overlapped time period Tp is less than or equal to a threshold, wherein $T_p + T_t = 2T_s$, the UE may regard that the CCA slot in the time period T0 is idle; otherwise, the UE is required to perform additional CCA detection, e.g., the CCA time period is proportionally increased according to the length of the overlapped total time period Tt, i.e., the requirement for the total CCA time period includes $T_c = T_{cca} \cdot T_t / T_s$; or, it is required that the channel detection is performed at least in the time period $2T_{cca} = 8$ us in the total time period after the two CCA slots are overlapped. Alternatively, when the CCA slot in the time period T0 and the CCA slot in the time period of the CAT4 are partially overlapped, it may be required that the channel detection is performed in a time period with the length Tcca in a CCA slot in the time period T0, when it is detected that the energy is less than the CCA threshold, it is determined that the CCA slot is idle. For the time period above with the length Tcca, its location in the CCA slot of the time period T0 is not limited, further, whether it is completely overlapped, is partially overlapped, or is not overlapped with a time period with the length Tcca for the channel detection in the time period T0 is not limited.

Embodiment 4

On a carrier in an unlicensed frequency band, depending on scheduling of a base station, a UE may perform CAT2 LBT or CAT4 LBT for channel contention, and may perform uplink transmission after the LBT is successfully completed. For CAT2, the UE only needs to detect that the channel is idle in T1 us before the start timing of the uplink transmission, e.g., T1 is equal to 25 us, and the UE may occupy the channel. For CAT4, according to a size of a current CW, a random number N is generated, after detecting that the channel is idle in T2 us, e.g., T2 is equal to 25 us, the UE continues to detect the channel, when the number of the current idle CCA slots reaches N, the channel can be occupied. For the CAT4 LBT, the size of the CW may be changeable. For example, an initial value of the CW is firstly set, e.g., a minimum value of the CW; when an error of the data transmission occurs, the size of the CW is increased, e.g., the size of the CW is changed according to exponential variations. When a certain condition is satisfied, e.g., after the data transmission successes, the CW is recovered to the minimum value.

Differences between the CAT2 and the CAT4 includes that a time period of the CCA detection of the CAT2 has a fixed length, i.e., T1, so that it is beneficial for preempting the channel; while the time period of the CCA detection of the CAT4 is variable, i.e., the time period is equal to a fixed time period T2 plus k CCA slots, k is a random number, and the value range is from 0 to a value of the current CW. The CW is changed between CWmin to CWmax, e.g., CWmin is equal to 3, and CWmax is equal to 7. By defining that the value of the CW is always more than or equal to 1, the channel idle time period required by the CAT4 is longer than that of the CAT2, so that a capability of the channel occupancy of the CAT4 is lower than that of the CAT2, but coexistence performance provided by the CAT4 is more friendly than the CAT2. In order to combine advantages of the CAT2 and the CAT4, a method includes configuring a minimum value of the CW of the CAT4, i.e., the CWmin is equal to 0, and CWmax is still a positive integer. When it is configured that the CW is equal to CWmin which is 0, the random number N generated according to the CAT4 mechanism must be equal to 0, thus, it is only required that the uplink data is started to be transmitted after the UE detects the idle time period T2, which is equivalent to the CAT2 mechanism. Thus, when the channel is very idle, the UE may work mainly based on the CAT2, when the channel overhead is increased, since decoding fails caused by a problem, such as a terminal is hided, etc., the UE starts to work according to the CAT4 by increasing the CW, so as to be beneficial for coexistence.

In existing downlink LAA standards, the base station determines whether the size of the CW is adjusted according to HARQ-ACK information of the date transmission in a first subframe in a time period for downlink transmission. If the first subframe is not an entire subframe, HARQ-ACK information for a second subframe in the time period of the downlink transmission is also used to determine whether the size of the CW is adjusted. In particular, in one or two subframes available for adjusting the CW, if a proportion of NACK feedback by each UE is more than or equal to Z, Z=80%, the size of the CW needs to be added; otherwise, the size of the CW is set as CWmin. In addition, for a LBT priority, if the base station has transmitted the number of the CCA slots for random backoff at consecutive K times based on the maximum value of the CW, the size of the CW is re-set as CWmin.

For the uplink transmission of a carrier in an unlicensed frequency band, according to the method in Embodiment 1, i.e., according to whether the uplink transmission is within the MCOT of the base station, the LBT mechanism of the UE may be configured as CAT2, CAT4, or NO LBT. According the present disclosure, how to determine a reference subframe used for adjusting the CW of the uplink CAT4 is described below.

A first method for determining an uplink reference subframe includes since the size of the CW of the CAT4 is to be adjusted, the uplink reference subframe may be limited as the uplink subframe which is configured to use CAT4 channel contention for the UE. That is because data transmission failure which occurs when the UE actually performs the CAT4 can truly reflect that the CW parameter of the CAT4 is wrongly set. For a UE, the uplink reference subframe may be an uplink subframe scheduled based on the CAT4 by the base station. For example, based on a first uplink subframe for the uplink transmission recently scheduled based on the CAT4, i.e., if the base station may perform consecutive scheduling in multiple subframes, the CAT2 is used in a former part, and the CAT4 is used in other subframes, the uplink reference subframe is a first uplink subframe scheduled by using the CAT4. Alternatively, for a UE, the uplink reference subframe may an uplink subframe actually transmitted by the UE in the recent uplink transmission scheduled based on the CAT4, e.g., a first uplink subframe actually transmitted for the recent uplink transmission scheduled based on the CAT4, i.e., the base station may consecutively schedule multiple subframes, wherein the CAT2 is used in a former part, and the CAT4 is used in other subframes, the uplink reference subframe is the first uplink subframe which is scheduled by using the CAT4 and where the UE actually transmitted by the UE. Since a UL-Grant is not received and/or the LBT of the UE fails, the first uplink subframe actually transmitted may not the first subframe scheduled by the base station by using the CAT4. Alternatively, for a UE, the uplink reference subframe may be a part or all of uplink subframes scheduled based on the CAT4 in a time period of the recent uplink transmission. According to the method above, the recent uplink transmission refers to the uplink transmission for which the base station has known whether the data transmission of the UE successes. In the one or more uplink subframes of the recent uplink transmission scheduled based on the CAT4, it is not limited whether another method to determine the uplink reference subframe is used according to the present disclosure.

According to the method in Embodiment 2, if the base station configures the LBT for a group of carriers, the CAT4 is only performed on a carrier, and the CAT2 is performed on another carrier, since the carrier where the CAT4 is performed actually has considered the data transmission status of another carrier in the same group, the uplink subframe where the CAT2 is performed on the another carrier may taken as the uplink reference subframe of adjusting the CAT4 CW on the corresponding carrier.

A second method for determining the uplink reference subframe includes that the LBT category on which the data transmission is based, i.e., the CAT2 and the CAT4, is not distinguished, the size of the CW is adjusted according to whether the uplink data of the UE is successfully decoded; and the uplink transmission by using NO LBT is not taken as a basis of adjustment of the size of the CW. Alternatively, a third method for determining the uplink reference subframe includes the LBT category on which the data transmission is based, i.e., CAT2, CAT4 or NO LBT is not distinguished, and the size of the CW is adjusted according to whether the uplink data of the UE is successfully decoded. For example, for a UE, the uplink reference subframe may be an uplink subframe for the recent uplink transmission scheduled by the base station, e.g., in the second method for determining the uplink reference subframe, the first scheduled uplink subframe except the uplink subframe scheduled through NO LBT is taken as the uplink reference subframe, and in the third method for determining the uplink reference subframe, the first uplink subframe scheduled by the base station is taken as the uplink reference subframe. Alternatively, for a UE, the uplink reference subframe may be an uplink subframe where the UE actually performs the transmission in the recent uplink transmission scheduled by the base station, e.g., in the second method for determining the uplink reference subframe, the first uplink subframe where transmission is actually performed except the uplink subframe where NO LBT is used is taken as the uplink reference subframe; and in the third method for determining the uplink reference subframe, the first uplink subframe where the UE actually performs the transmission in the recent uplink transmission scheduled by the base station. Alternatively, for a UE, the uplink reference subframe may be a part or all of the uplink subframes in the time period of the recent uplink transmission, e.g., in the second method for determining the uplink reference subframe, the uplink transmission scheduled by using the NO LBT is not used for adjusting the size of the CW. According to the method above, the recent uplink transmission refers to the uplink transmission for which the base station has known whether the data transmission of the UE successes. In the second method for determining the reference subframe, except the uplink subframe by using the NO LBT, it is not limited whether another method is used to determine the reference subframe for the one or more uplink subframes for the recent uplink transmission scheduled by the base station according to the present disclosure. In the third method for determining the reference subframe, it is not limited whether another method is used to determine the reference subframe for the one or more uplink subframes for the recent uplink transmission scheduled by the base station according to the present disclosure.

In a condition that the base station is responsible for maintaining the CW of the CAT4 operation of the UE, the CW adjusting method may be further divided into three conditions, whether it causes that the UE does not transmit the uplink data because the UE does not receive the UL-Grant; or, the UE does not transmit the uplink data because the uplink LBT failure of the UE; and the UE detects the UL-Grant, successfully performs the LBT, transmits the uplink data, however, the base station fails to perform decoding.

After determining the uplink reference subframe, e.g., using the three methods above for determining the uplink reference subframe, the CW updating method is further described below. It is not limited whether another method for updating the CW based on the uplink reference subframe is used according to the present disclosure.

For example, a proportion of uplink data decoding failure of the uplink reference subframe is more than or equal to a threshold Y, e.g., the threshold Y is equal to 80%, the CW of the UE is increased except that the CW has reached the maximum value. Alternatively, when the uplink data decoding failure occurs in at least one uplink reference subframe, the CW of the UE is increased except that the CW has reached the maximum value. Alternatively, when the decoding failure occurs for the all uplink data in the uplink reference subframe, the CW of the UE is increased except that the CW has reached the maximum value. When multiple LBT priorities are supported for the uplink transmission, the operation above may include updating CAT4 parameters of all LBT priorities together. Alternatively, the operation above may include respectively updating the CAT4 parameters of the LBT priorities, i.e., in this example, only the size of the CW of the LBT priority of the uplink transmission in the uplink reference subframe is updated, and the CW of other LBT priorities are not changed.

For example, when the proportion of the uplink data decoding failure in the uplink reference subframe is less than a threshold W, e.g., the threshold W is less than or equal to 80%, the size of the CW is set as CWmin. Alternatively, when all uplink data in the uplink reference subframe are successfully received, the size of the CW is set as CWmin. Alternatively, when at least one uplink data in the uplink reference subframe is successfully received, the size of the CW is set as CWmin. When the multiple LBT priorities are supported for the uplink transmission, the operation above may include that the CWs of all the LBT priorities are set as CWmin. Alternatively, the operation above may include respectively update the CAT4 parameters of the LBT priorities, i.e., in this example, only the CW of the LBT priority for the uplink transmission in the uplink reference subframe is set as CWmin, and the CW of other LBT priorities are not changed.

For the two conditions of increasing the size of the CW and recovering the CW to CWmin, a same method may be used for determining the uplink reference subframe, e.g., one of the three methods above for determining the uplink reference subframe. Alternatively, different methods for determining the uplink reference subframe are respectively used in the two conditions above. For example, the second or third method for determining the uplink reference subframe is used for increasing the size of the CW, and it is limited that only the first method for determining the uplink reference is used for recovering the CW to CWmin.

When one or more LBT priorities are supported for the uplink transmission, for a LBT priority, when the number of the CCA slots used for random backoff has been generated based on the maximum value of the CW at consecutive K times, K is more than or equal to 1, the size of the CW of the LBT priority may be re-set as CWmin; alternatively, the sizes of the CWs of all the LBT priorities may be re-set as CWmin. If the base station only schedule the uplink data transmission for the UE based on NO LBT or CAT2, the base station may not update for any of the LBT priorities of the UE, the times that number of CCA slots in random backoff is generated based on the maximum value of the CW. Alternatively, it is assumed that the base station schedules the uplink transmission of the UE based on the CAT4, and the size of the CW currently used is the maximum value of the CWs of the LBT priority scheduled at this time, however, the base station detects that the UE actually does not transmit the uplink data, e.g., the UE does not receive the UL-Grant or the LBT fails, the base station may not update for the LBT priority of the UE, the times that number of CCA slots in random backoff is generated based on the maximum value of the CW, or the base station may still add one for the LBT priority to the times that number of CCA slots in random backoff is generated based on the maximum value of the CW. It is assumed that the UE maintains the CAT4 parameter, if the UE receives the UL-Grant which indicates the CAT4, the size of the CW currently used is the maximum value of the CWs of the current LBT priority, but the UE does not successfully complete the LBT, thus, does not transmit the uplink data, the UE may not update for the current LBT priority the times that number of CCA slots in random backoff is generated based on the maximum value of the CW, or the UE may still add one for the current LBT priority to the times that number of CCA slots in random backoff is generated based on the maximum value of the CW.

For the operation for adjusting the CW above, when the base station schedules the uplink transmission of the UE each time, the size of the CW of the CAT4 may be adjusted according to the recent uplink transmission of the UE; alternatively, when the base station schedules the uplink transmission of the UE based on the CAT4 each time, the size of the CW of the CAT4 may be adjusted according to the recent uplink transmission of the UE. A time interval T between two times of CW adjustment may be further limited, T is a parameter pre-defined or configured by higher layer, e.g., only when the time interval of the two times of performing uplink scheduling is more than T, the size of the CW needs to be adjusted; alternatively, only when the time interval between the two times of performing the uplink scheduling based on CAT4 is more than T, the size of the CW needs to be adjusted. Alternatively, only when the two times of performing the uplink scheduling do not belong to a same MCOT, the size of the CW needs to be adjusted. Alternatively, only when the two times of performing the uplink scheduling based on the CAT4 do not belong to a same MCOT, the size of the CW needs to be adjusted. Alternatively, when the CW is adjusted based on the uplink reference subframe and the current uplink reference subframe for the uplink transmission scheduled based on the CAT4 at this time and the uplink reference subframe for the uplink transmission scheduled based on the CAT4 at previous time do not belong to a same subframe, the size of the CW needs to be adjusted; otherwise, the CW is not changed. For example, it is assumed that the base station transmits multiple UL-Grants in a downlink subframe or the UL-Grants are respectively transmitted in consecutive downlink subframes, and the uplink transmission is scheduled by the multiple UL-Grants are respectively based on the CAT4; since the multiple UL-Grants is within a same downlink subframe or consecutive downlink subframes and the uplink reference subframe for CW adjustment may correspond to a same uplink subframe, the CW does not need to be repeatedly updated for the uplink transmission scheduled by the multiple UL-Grants above.

Corresponding to the method above, the present disclosure further discloses a an apparatus of a base station, as shown in FIG. 16, the apparatus includes a scheduling module and a transmitting and receiving module, wherein, the scheduling module is configured to allocate an uplink resource and a downlink resource for a UE according to a CA processing capability of the UE and a LBT processing capability of the UE, configure a LBT mechanism and a corresponding parameter used for uplink transmission, and adjusting a status parameter of CAT4 according to information fed back from the UE; and the transmitting and receiving module is to transmit scheduling signaling to the UE to indicate the UE to perform uplink and downlink transmission, transmit downlink data, receive uplink data accordingly.

Corresponding to the method above, the present disclosure further discloses a an apparatus of a UE, as shown in FIG. 17, the apparatus includes a scheduling parsing module and a transmitting and receiving module, wherein, the scheduling parsing module is configured to parse scheduling signaling of a base station, determine an uplink resource and a downlink resource allocated by the base station, determine a LBT mechanism used for uplink transmission and a corresponding parameter; and the transmitting and receiving module is configured to report CA processing capability of the UE and a LBT processing capability of the UE, transmit downlink data, and receive uplink data accordingly.

Those skilled in the art will be appreciated that all or part of the steps in the above-described embodiments may be accomplished by hardware, or by a program instructing relevant hardware, wherein the program may be stored in a computer readable storage medium, when the program is performed, one or a combination of the steps in the method embodiments is included.

In addition, according to some embodiments of the present disclosure, various function modules may be integrated into a processing entity, or may be separately deployed in physical, or two or more modules may be integrated into a processing entity. The integrated entity above can be implemented through hardware, or can be implemented through a software functional entity. If the integrated entity is implemented through the software functional entity, and is sold or used as an independent product, the integrated entity can be stored in the computer readable storage medium.

The mentioned storage medium may be a read-only memory, magnetic disk or optical disk.

The foregoing is only preferred examples of the present invention and is not used to limit the protection scope of the present invention. Any modification, equivalent substitution and improvement without departing from the spirit and principle of the present invention are within the protection scope of the present invention.

The invention claimed is:

1. A method by a terminal for transmitting data in a wireless communication, the method comprising:
   transmitting, to a base station, an uplink signal in a first reference time resource;
   identifying hybrid automatic repeat request (HARQ) related information corresponding to the uplink signal;
   identifying whether the first reference time resource is the same as a second reference time resource;
   adjusting a value of a contention window (CW) for performing a first procedure, based on the identified HARQ related information, in case that the first reference time resource is not the same as the second reference time resource, wherein the first procedure is performed based on a detection that determines an available channel for performing transmissions; and
   keeping the value of the CW for each priority, in case that the first reference time resource is the same as the second reference time resource,
   wherein the first reference time resource is a most recent time resource in which the terminal has transmitted an uplink transmission according to the first procedure, before a first uplink grant including the HARQ related information is received from the base station, and
   wherein the second reference time resource is a most recent time resource in which the terminal has transmitted an uplink transmission according to the first procedure, before a second uplink grant previous of the first uplink grant was received.

2. The method of claim 1, wherein adjusting a value of a CW comprises:
   increasing the value of the CW for each priority class, in case that decoding for the uplink signal is identified as being failed based on the HARQ related information.

3. The method of claim 1, wherein adjusting a value of a CW comprises:
   setting the value of the CW as a value of a CW with a minimum size for each priority class, in case that decoding for the uplink signal is identified as being successful based on the HARQ related information.

4. The method of claim 1, further comprising:
   identifying that a value of a CW with a maximum size for a priority class is used consecutively K times for generation of a number; and
   resetting, for the priority class, the value of the CW with the maximum size as a value of a CW with a minimum size.

5. The method of claim 4,
   wherein the K is greater than or equal to 1, and
   wherein the number is set from between 0 and the value of the CW.

6. A terminal for transmitting data in a wireless communication, the terminal comprising:
   a transceiver; and
   a controller configured to:
      control the transceiver to transmit, to a base station, an uplink signal in a first reference time resource;
      identify hybrid automatic repeat request (HARQ) related information corresponding to the uplink signal;
      identify whether the first reference time resource is the same as a second reference time resource;
      adjust a value of a contention window (CW) for performing a first procedure, based on the identified HARQ related information, in case that the first reference time resource is not the same as the second reference time resource, wherein the first procedure is performed based on a detection that determines a channel for performing transmissions being available, and
      keeping the value of the CW for each priority, in case that the first reference time resource is the same as the second reference time resource,
   wherein the first reference time resource is a most recent time resource in which the terminal has transmitted an uplink transmission according to the first procedure, before a first uplink grant including the HARQ related information is received from the base station, and
   wherein the second reference time resource is a most recent time resource in which the terminal has transmitted an uplink transmission according to the first procedure, before a second uplink grant previous of the first uplink grant was received.

7. The terminal of claim 6,
   wherein the controller is further configured to increase the value of the CW for each priority class, in case that decoding for the uplink signal is identified as being failed based on the HARQ related information.

8. The terminal of claim 6,
   wherein the controller is further configured to set the value of the CW as a value of a CW with a minimum size for each priority class, in case that decoding for the uplink signal is identified as being successful based on the HARQ related information.

9. The terminal of claim 6, wherein the controller is further configured to identify that a value of a CW with a maximum size for a priority class is used consecutively K times for generation of a number, and reset, for the priority class, the value of the CW with the maximum size as a value of a CW with a minimum size.

10. The terminal of claim 9,
wherein the K is greater than or equal to 1, and
wherein the number is set from between 0 and the value of the CW.

\* \* \* \* \*